(12) United States Patent
Venkatashivareddy et al.

(10) Patent No.: US 11,372,943 B2
(45) Date of Patent: Jun. 28, 2022

(54) CUSTOM TYPES CONTROLLER FOR SEARCH ENGINE SUPPORT

(71) Applicant: SAP SE, Walldorf (DE)

(72) Inventors: Harish Kumar Kadirompalli Venkatashivareddy, San Jose, CA (US); Christopher Collins, Belmont, CA (US); Gireesh Malaksamudra, San Jose, CA (US); Rajeswari Krishnasamy Natarajan, Mountain View, CA (US)

(73) Assignee: SAP SE, Walldorf (DE)

( * ) Notice: Subject to any disclaimer, the term of this patent is extended or adjusted under 35 U.S.C. 154(b) by 35 days.

(21) Appl. No.: 17/110,204

(22) Filed: Dec. 2, 2020

(65) Prior Publication Data

US 2022/0121721 A1    Apr. 21, 2022

Related U.S. Application Data

(60) Provisional application No. 63/092,910, filed on Oct. 16, 2020.

(51) Int. Cl.
*G06F 7/02* (2006.01)
*G06F 16/00* (2019.01)
*G06F 16/9538* (2019.01)
*G06F 16/951* (2019.01)
*G06F 16/30* (2019.01)

(52) U.S. Cl.
CPC ........ *G06F 16/9538* (2019.01); *G06F 16/951* (2019.01); *G06F 16/30* (2019.01)

(58) Field of Classification Search
CPC .... G06F 16/9538; G06F 16/951; G06F 16/93; G06F 16/30
See application file for complete search history.

(56) References Cited

U.S. PATENT DOCUMENTS

| | | | |
|---|---|---|---|
| 9,378,226 B1* | 6/2016 | Wu | G06F 16/211 |
| 2012/0239669 A1* | 9/2012 | Miller | G06F 16/243 |
| | | | 707/E17.014 |
| 2017/0193060 A1* | 7/2017 | Khanzode | G06F 16/338 |

* cited by examiner

*Primary Examiner* — Bruce M Moser
(74) *Attorney, Agent, or Firm* — Mintz Levin Cohn Ferris and Popeo, P.C.

(57) ABSTRACT

A method may include defining, based on one or more user inputs, a custom type including one or more fields having one or more capabilities. In response to a first request from a publish service, the custom type may be sent to the publish service such that the publish service publishes, to a search system, one or more documents in accordance with a schema specified by the custom type. In response to a second request from a search service, a response may be sent to the search service identifying one or more field names and/or methods at the search system that correspond to one or more fields and/or actions specified by a first query received at the search service. The one or more field names and/or methods may be identified based at least on the custom type. Related systems and articles of manufacture, including computer program products, are also provided.

20 Claims, 11 Drawing Sheets

SOLR SCHEMA.

```
<dynamicField name="+_stop_en_s" type="stop_en" indexed ="true" stored = "false"/>
<dynamicField name="+_stop_en_m" type="stop_en" indexed = "true" multivalued ="true" stored = "false"/>
``` language.

fmt = "+ _ stop_ %s_ %s"    Multivalued /
          (or)          (or)
      "+_ int _ %s"    Single Valued.

Assigned To

```
method: {
    "name" :        "stop",
    "description" : "Remove's stop words",
    "fmt" :         "+ _ stop _ %s_ %s",
    "i18n" :        true
}
```

```
group : {
    "name" :         "<ANY NAME>"//won't make much of a difference/impact on logic. It's just there.
    "view" :         "Index"
    "method" :       " stop "
    "capabilities" : { " freeTextSearch " : true }
}
```

Assigned To

→ Field / Field Type.

FIG. 4A

CUSTOM TYPES CONTROLLER FOR SEARCH ENGINE SUPPORT

CROSS REFERENCE TO RELATED APPLICATION

This application claims priority to U.S. Provisional Application No. 63/092,910, filed on Oct. 16, 2020, entitled "CUSTOM TYPES CONTROLLER FOR SEARCH ENGINE SUPPORT," the disclosure of which is incorporated herein by reference in its entirety.

TECHNICAL FIELD

The subject matter described herein relates generally to database processing and more specifically to custom types for storing and querying documents in a database.

BACKGROUND

A database (e.g., a relational database, a non-relational database, and/or the like) may be configured to store a plurality of electronic data records. These data records may be organized into various database objects including, for example, database tables, graphs, documents, and/or the like. The database may be coupled with a database management system (DBMS) that supports a variety of operations for accessing the data records held in the database. These operations may include, for example, structure query language (SQL) statements, a graph query language statement, and/or the like.

SUMMARY

Systems, methods, and articles of manufacture, including computer program items, are provided for a custom types controller. In one aspect, there is provided a system. The system may include at least one data processor and at least one memory. The at least one memory may store instructions that cause operations when executed by the at least one data processor. The operations may include: defining, based at least on one or more user inputs, a custom type including at least a first field having a first capability; in response to a first request from a publish service, sending, to the publish service, the custom type such that the publish service publishes, to a search system, one or more documents in accordance with a schema specified by the custom type; and in response to a second request from a search service, sending, to the search service, a response identifying one or more field names and/or methods at the search system that correspond to one or more fields and/or actions specified by a first query received at the search service, the one or more field names and/or methods identified based at least on the custom type.

In some variations, one or more features disclosed herein including the following features can optionally be included in any feasible combination. The first capability may include index, free text search, keyword search, type ahead suggestion, hierarchical values, geospatial search, range, key, sort, facet, or filter.

In some variations, the first field may be further defined to have a canonical type including Boolean, currency, date, double, float, integer, long value, part number, string, email, domain value, duration, image, point, entext, price, universal resource locator, or address.

In some variations, a validation error may be generated in response to determining that the canonical type of the first field is incompatible with the first capability.

In some variations, a request to update the custom type by deleting the first field and/or adding a second field may be received. In response to determining that the update necessitates a re-indexing of the one or more documents at the search system, the update may be maintained in an inactive state until the re-indexing is complete. The second request may be responded to based on the custom type without the update while the update is in the inactive state.

In some variations, the first field may be enriched by at least associating, with the first field, a second field having a second capability.

In some variations, the first field may be is mapped, based at least on the first capability of the first field, to one or more groups of fields having the first capability.

In some variations, the defining of the custom type may include associating the custom type with a type identifier. The first request may include the type identifier. At least a portion of the custom type sent to the publish service may be cached at the publish service.

In some variations, the second request may identify a software application and a tenant associated with the first query. The one or more field names and/or methods at the search system may be identified by least identifying the custom type as being associated with the software application and/or the tenant.

In some variations, the response may enable the search service to generate, for execution at the search system, a second query including the one or more field names and/or methods at the search system.

In another aspect, there is provided a method for a custom types controller. The method may include: defining, based at least on one or more user inputs, a custom type including at least a first field having a first capability; in response to a first request from a publish service, sending, to the publish service, the custom type such that the publish service publishes, to a search system, one or more documents in accordance with a schema specified by the custom type; and in response to a second request from a search service, sending, to the search service, a response identifying one or more field names and/or methods at the search system that correspond to one or more fields and/or actions specified by a first query received at the search service, the one or more field names and/or methods identified based at least on the custom type.

In some variations, one or more features disclosed herein including the following features can optionally be included in any feasible combination. The first capability may include index, free text search, keyword search, type ahead suggestion, hierarchical values, geospatial search, range, key, sort, facet, or filter.

In some variations, the first field may be further defined to have a canonical type including Boolean, currency, date, double, float, integer, long value, part number, string, email, domain value, duration, image, point, entext, price, universal resource locator, or address.

In some variations, the method may further include generating a validation error in response to determining that the canonical type of the first field is incompatible with the first capability.

In some variations, the method may further include: receiving a request to update the custom type by deleting the first field and/or adding a second field; in response to determining that the update necessitates a re-indexing of the one or more documents at the search system, maintaining the update in an inactive state until the re-indexing is complete; and responding to the second request based on the custom type without the update while the update is in the inactive state.

In some variations, the method may further include: enriching the first field by at least associating, with the first field, a second field having a second capability.

In some variations, the first field may be mapped, based at least on the first capability of the first field, to one or more groups of fields having the first capability.

In some variations, the defining of the custom type may include associating the custom type with a type identifier. The first request may include the type identifier. At least a portion of the custom type sent to the publish service may be cached at the publish service.

In some variations, the second request may identify a software application and a tenant associated with the first query. The one or more field names and/or methods at the search system may be identified by least identifying the custom type as being associated with the software application and/or the tenant. The response may enable the search service to generate, for execution at the search system, a second query including the one or more field names and/or methods at the search system.

In another aspect, there is provided a computer program product including a non-transitory computer readable medium storing instructions. When executed by at least one data processor, the instructions may cause operations that include: defining, based at least on one or more user inputs, a custom type including at least a first field having a first capability; in response to a first request from a publish service, sending, to the publish service, the custom type such that the publish service publishes, to a search system, one or more documents in accordance with a schema specified by the custom type; and in response to a second request from a search service, sending, to the search service, a response identifying one or more field names and/or methods at the search system that correspond to one or more fields and/or actions specified by a first query received at the search service, the one or more field names and/or methods identified based at least on the custom type.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a search engine, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4A depicts a schematic diagram illustrating an example of a group, in accordance with some example embodiments;

When practical, similar reference numbers denote similar structures, features, or elements.

DETAILED DESCRIPTION

Figure 1A:
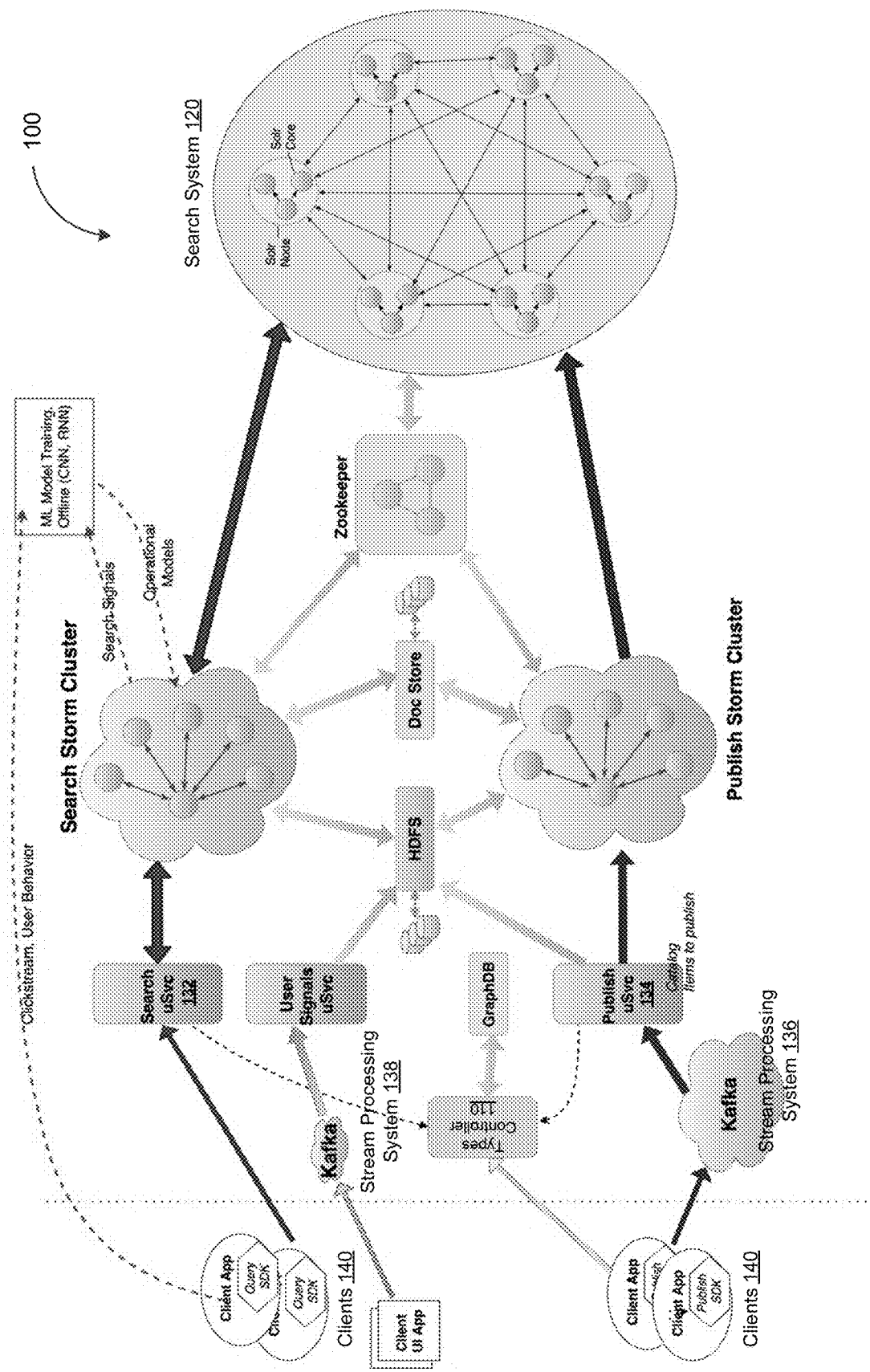
FIG. 1A depicts a schematic diagram illustrating an example of a search system, in accordance with some example embodiments.

A search engine may be configured to identify one or more items that match a search phrase describing an item such as, for example, a product, a service, and/or the like. For example, in response to the receiving the search phrase from a user, the search engine may query, based on the search phrase, a database storing a plurality of item descriptions. To determine whether an item matches the search phase, a conventional search engine may determine whether the description of the item contains words matching one or more of the words in the search phrase. However, identifying matching items in this manner may yield an excessively large result set that lacks sufficient relevance to the search phrase and, in particular, its underlying intent.

To improve the relevance of search results, documents corresponding to various items may be stored and queried based on a type. As used herein, a "type" may refer to a data model or schema according to which a document corresponding to an item may be published, for example, to a search system (or subsystem) such as an enterprise search platform. Publishing a document according to a type may lend structure to at least a portion of the data included in the document. For example, a type may include multiple fields, each of which containing data of a canonical type. Accordingly, a document corresponding to an item may include fields populated with data associated with the item. A query to identify one or more items matching a search phrase may be resolved based on the data in the corresponding fields of the search phrase and the documents corresponding to various items, which may yield more relevant search results than merely matching words present in the search description and in the descriptions of the items. To expedite such queries, a search index may be generated by at least indexing, based on one or more common fields, documents corresponding to multiple items, for example, from a catalog of items.

A type may be defined, for example, by a user, to include one or more fields. Nevertheless, the type is typically define to include one or more fields from a predefined set of fields. The fields that are present in the type may determine the behavior of the search system (e.g., enterprise search platform and/or the like) operating on the corresponding documents including, for example, the indexing of the corresponding documents. As such, a type that is defined based on a predefined set of fields may not be suitable across different search systems. Moreover, a type that is defined based on a predefined set of fields may not be able to accommodate subsequent changes, such as the modification and/or deletion of one or more fields, without necessitating a re-indexing of the corresponding documents.

Accordingly, in some example embodiments, a custom types controller may be configured to lend flexibility to type definition by at least supporting custom types. For example, a user may define a custom type to include one or more fields, each of which adhering to a user selectable canonical type (e.g., primitive type field, complex type field, and/or the like) as well as one or more user selectable capabilities. Moreover, one or more of the fields in the type may be defined for enrichments such as search-specific enrichments configured to improve the relevance of the search results. The canonical type and the capabilities of the fields included in a type may determine the behavior of the search system (e.g., enterprise search platform and/or the like) operating on the corresponding documents. For instance, a field may be defined to exhibit one or more capabilities such as indexing, free text search, keyword, type ahead suggestion, hierarchical values, geospatial search, range, key, sorting, faceting, filtering, and/or the like. The custom types controller may generate, based at least on the canonical types and the capabilities of the fields included in the custom type, an internal schema for the search system to which the corresponding documents are published. This internal schema may determine the behavior of the search system including, for example, the indexing of the documents having the custom type. Moreover, by supporting custom types, the custom types controller may be a language aware, semantically rich entity modelling system with the capability to cleanse data, enrich data (e.g., including first order support of natural language processing based on a native understanding and modeling of language), and provide projections to alternative representations (e.g., search index, data wrangling, and/or the like).

FIG. 1A depicts a schematic diagram illustrating an example of a search system 100, in accordance with some example embodiments. Referring to FIG. 1A, the search system 100 may include a types controller 110, a search system 120, a search microservice 132, a publish microservice 134, and one or more clients 130. The types controller 110, the search system 120, the search microservice 132, the publish microservice 134, and the one or more clients 140 may be communicatively coupled via one or more wired networks and/or wireless networks including, for example, a public land mobile network (PLMN), a local area network (LAN), a wide area network (WAN), a virtual local area network (VLAN), the Internet, and/or the like.

Figure 1B:
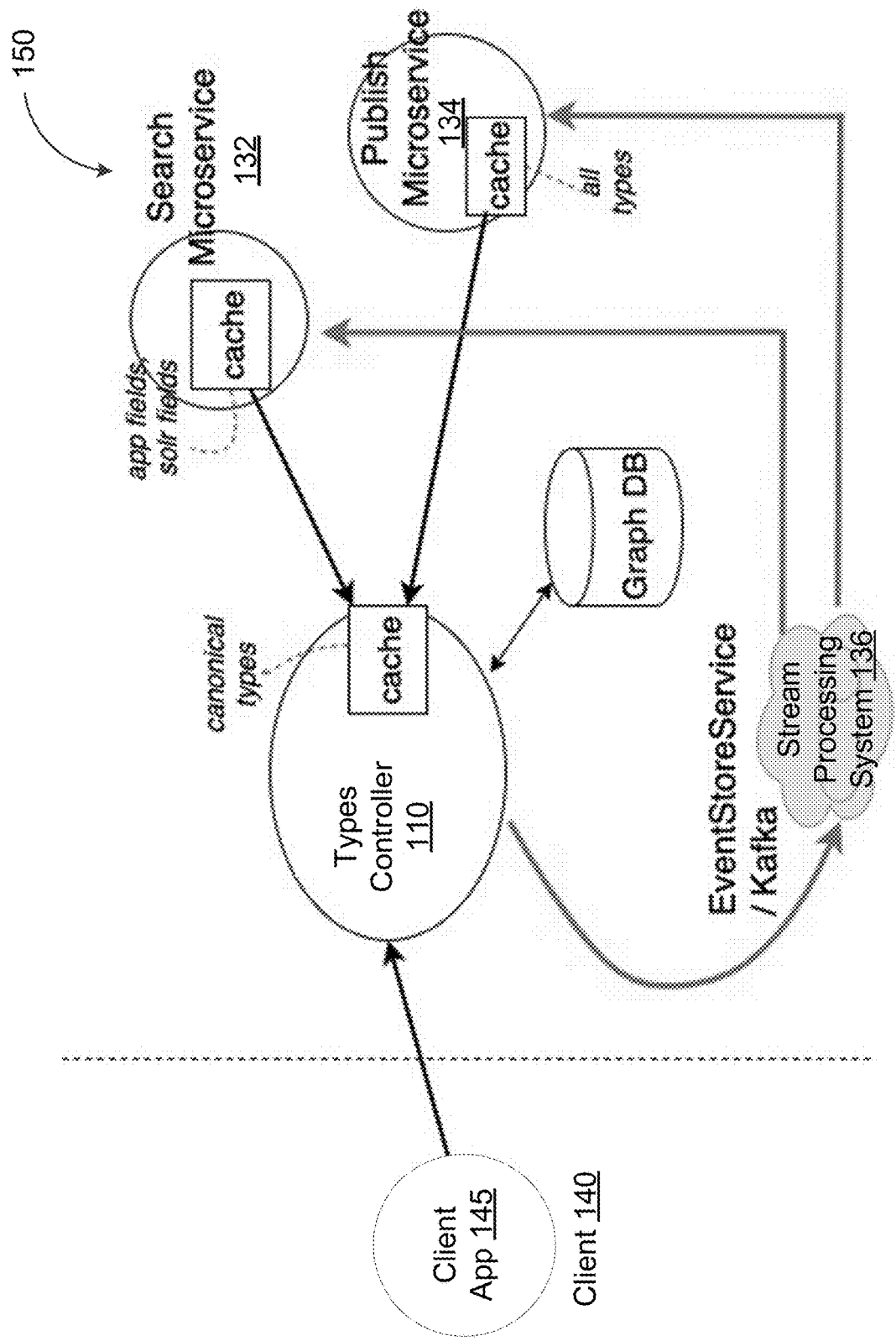
FIG. 1B depicts a system diagram illustrating an example of a custom type system, in accordance with some example embodiments.

FIG. 1B depicts a system diagram illustrating an example of a custom type system 150, in accordance with some example embodiments. As shown in FIG. 1B, the client 140, the search microservice 132, and the publish microservice 134 may interact with the types controller 110, for example, via one or more wired networks and/or wireless networks including, for example, a public land mobile network (PLMN), a local area network (LAN), a wide area network (WAN), a virtual local area network (VLAN), the Internet, and/or the like. A user at a first client 140*a* may interact with a client application 145 to send, to the search microservice 132, a search phrase describing an item such as, for example, a product, a service, and/or the like. The search microservice 132 may respond to the search phrase by least identifying, in the documents published to the search system 120 by the publish microservice 134, documents matching the search phrase.

Each document published to the search system 120 may correspond to an item, for example, from a catalog of items. To improve the relevance of the search results generated by the search microservice 132, the documents may be published to the search system 120 according to a type. In some example embodiments, the type associated with one or more of the documents published to the search system 120 may be a custom type defined, for example, by a user at a second client 140*b* interacting with the types controller 110. For example, a type may be defined to include multiple fields, each of which containing data adhering to a canonical type such as a primitive canonical type or a complex canonical type. Accordingly, a document corresponding to an item may include fields populated with data associated with the item. A query to identify one or more items matching the search phrase may be resolved based on the search phrase as well as one or more search specific fields that have been expanded and/or enriched based on the canonical type and capabilities defined for each field within the custom type. Doing so may yield more relevant search results than merely matching words present in the search description and in the descriptions of the items. To expedite such queries, a search index may be generated at the search system 120 by at least indexing, based on one or more common fields, documents corresponding to multiple items, for example, from a catalog of items.

In some example embodiments, the types controller 110 may lend flexibility to type definition by at least supporting custom types. For example, the user at the second client 140*b* may define a custom type to include one or more fields, each of which having a user selectable canonical type (e.g., primitive type, complex type, and/or the like) as well as one or more user selectable capabilities. Moreover, one or more of the fields in the type may be defined for enrichments such as search-specific enrichments configured to improve the relevance of the search results. The canonical type and the capabilities of the fields included in a type may determine the behavior of the search system 120 operating on the corresponding documents. For instance, a field may be defined to exhibit one or more capabilities such as indexability, free text search, keyword, type ahead suggestion, hierarchical values, geospatial search, range, key, sortability, facetability, filterability, and/or the like. The types controller 110 may generate, based at least on the canonical types and the capabilities of the fields included in the custom type, an internal schema for the search system 120 to which the corresponding documents are published. This internal schema may determine the behavior of the search system 120 including, for example, the indexing of the documents having the custom type.

Figure 2A:
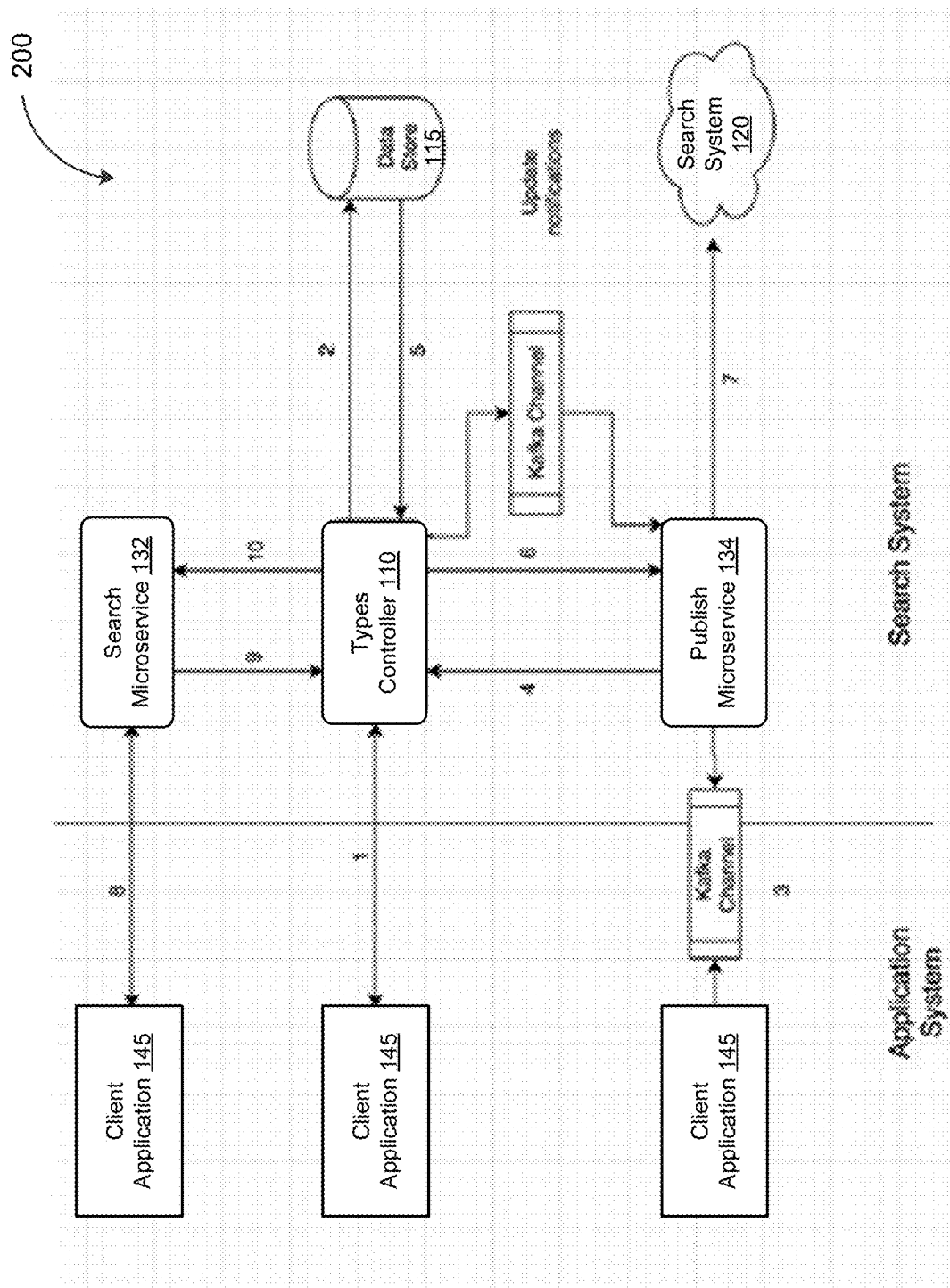
FIG. 2A depicts a functional diagram illustrating an example of a process for creating a type, in accordance with some example embodiments.

FIG. 2A depicts a functional diagram illustrating an example of a process 200 for creating a custom type, in accordance with some example embodiments. Referring to FIGS. 1A-B and 2A, the client application 145 may create a type by making an application programing interface (API) call (e.g., a Create API call) to the types controller 110 with a corresponding payload. The client application 145 may include an authentication token along with the request to create the type. The types controller 110 may validate the payload before saving the payload (e.g., in a data store 115) and returning a type identifier (or another reference to the type) back to the client application 145. It should be appreciated that the type identifier may be generated once as part of the type creation and may remain immutable thereafter. Upon receiving the type identifier from the types controller 110, the client application 145 may push, for example, to a messaging channel at a stream processing system 136, a payload (e.g., corresponding to an item from a catalog of items) including the type identifier received from the types controller 110 for publication by the publish microservice 144.

If the type referenced by the type identifier is not available at a local cache at the publish microservice 144, the publish microservice 144 may make an API call (e.g., a GET API call) to fetch the type from the types controller 110. In response, the types controller 110 may generate the schema for the type and return the schema to the publish microservice 144. The publish microservice 144 may store, in the local cache of the publish microservice 144, the schema of the type. Doing so may enable the publish microservice 144 to apply the schema of the type when publishing, to the search system 120, multiple consecutive documents on the same type of item.

Table 1 below depicts an example of a payload that may be included in an API call to the types controller 110 to create a custom type.

Table 1
CREATING A TYPE
POST ~/types
{
  "tenant": "realm_1",
  /* Tenant level Type, Type name should be of the format specified below
  "base:" is a reserved keyword, it should not be used for app types.
  Special characters: and_are not supported in the appname and typelabel.

*/
"type": "<appname>:<typelabel>",
/*base:catalog—System level Type that contains out of the box fields that are defined for every custom catalog type extension. */
"extends": "base: catalog",
"description": " ",
"fields": [
  {
    "name":"field1",
    "type":"base:entext" /* This field will be used in free text search queries */
    "capability":{
      "searchable":true,
      "freeTextSearch":true
    }
  }, {
    "name":"field2",
    "type":"base:image", /* Value in this field is just stored in the database, but not indexed OR available for index */
  },{
    "name":"field3",
    "type":"base:string", /* Value in this field will be available for searching and also for typeahead queries */
    "capability":{
      "searchable": true
      "typeAhead": true,
    }
  },{
    "name":"field4",
    "type":"base:string",
    "capability":{
      "searchable": true,
      "heirarchical": true
    }
  }
]
}

In some example embodiments, the client application 145 may, upon creating a custom type, update the custom type by adding, deleting, and/or updating one or more fields. For example, to update an existing type, the client application 145 may make an API call (e.g., an Update API call) to the types controller 110 with a corresponding payload. Along with the request, the client 145 may provide an authentication token for the transaction. To further illustrate, Table 2 below depicts an example of a payload for an API call to update an type.

Table 2
ADDITION OF FIELD—
POST ~/types/<type-name>/fields
{
  "name":"field1",
  "type":"base:string",
  "capability":{
    "typeahead": true,
  }
}
UPDATE A FIELD
PATCH ~/types/<type-name>/fields/<field-name>
{
  "name":"field2" /* Make field2 to be searchable */
  "capability":{

"searchable": true,
   }
}

An update to the type may be classified as either backward compatible or backward incompatible. The types controller 110 may validate the request to update the type and determine whether the update is backward compatible or backward incompatible. If the update is backward compatible, the types controller 110 may consume the request. Alternatively, if the update is backward incompatible, the types controller 110 may trigger, at the search system 120, a re-indexing background process. The client application 145 may be provided with an universal resource identifier (URI) handler to poll and check whether the update is consumed. During the re-indexing process, no other backward incompatible update requests may be accepted from the client application 145. By contrast, backward compatible update requests may still be accepted from the client application 145 during the re-indexing process.

If the update requires a re-indexing, the types controller 110 may maintain the update in an inactive state until the publish microservice 144 completes the re-indexing and switches to the new index. In the meantime, the types controller 110 may resolve all requests for the type on the version of the type that is in the active state. Moreover, if the update is backward compatible and compatible with updates already in progress, the types controller 110 may determine whether the update is applicable only to consecutive items ingested for publication, in which case the publish microservice 144 may continue to operate without any interruption from update.

Figure 2B:
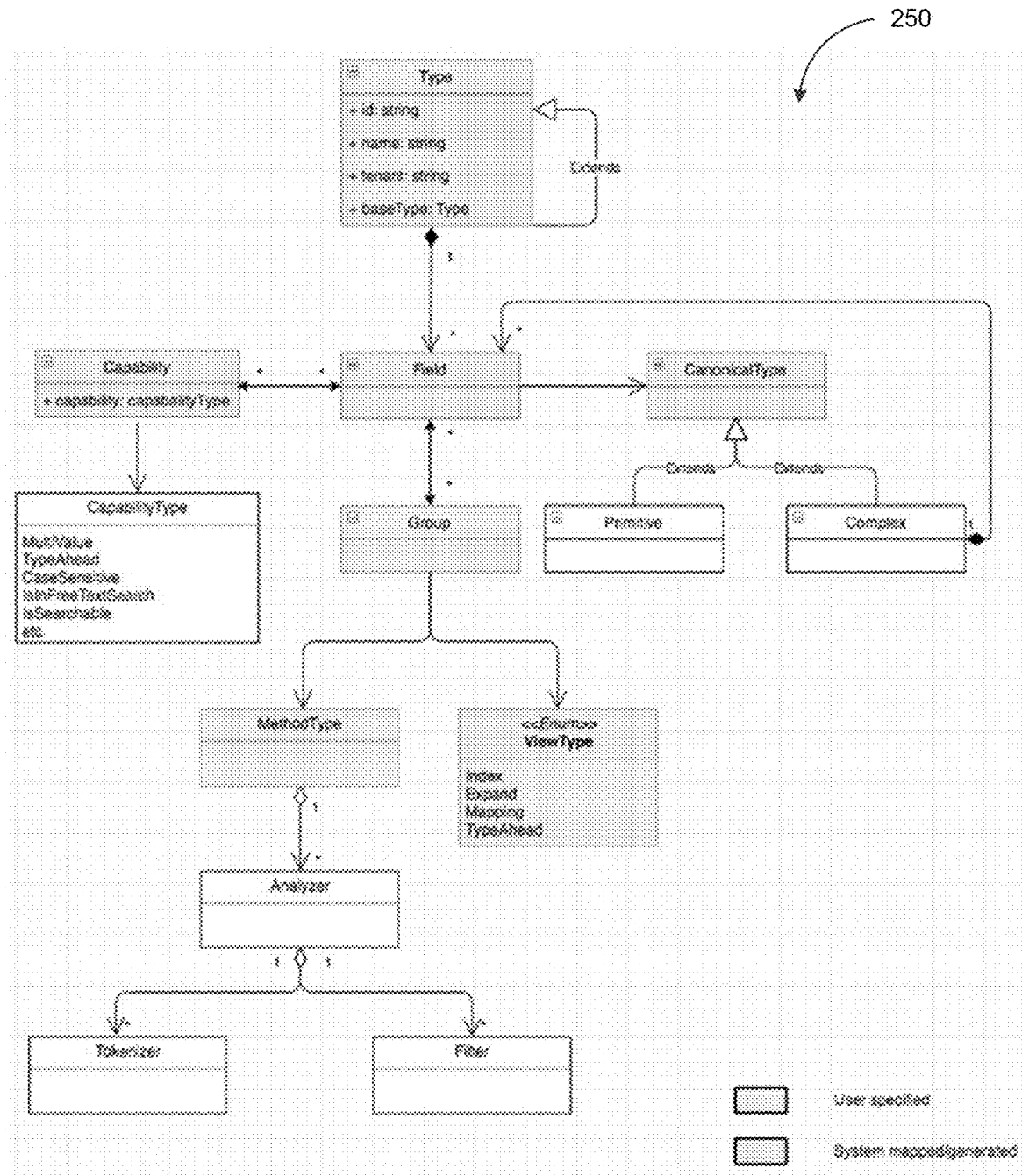
FIG. 2B depicts a schematic diagram illustrating an example of a model of a custom type, in accordance with some example embodiments.

The types controller 110 may be, as noted, configured to support the definition of custom types. A custom type may be specific to a single tenant or common across multiple tenants. Moreover, the types controller 110 may support a type hierarchy in which a custom type may be defined to inherit from one or more existing types. FIG. 2B depicts a schematic diagram illustrating an example of a model of a custom type 250, in accordance with some example embodiments. As shown in FIG. 2B, the custom type 250 may include one or more fields, each of which being a basic element of data and carrying its own metadata that defines how it will be reflected in a search index. The canonical type and/or the capabilities of each field in the custom type 250 may be specified by the user as part of defining the custom type 250. All fields of canonical type supported by the types controller may be stored, for example, in the data store 115.

The client 140 may define deeply nested complex fields whereas the types controller 110 may support a set of canonical types that can be used to define the structure of a field. To fill this gap, the types controller 110 may provide a canonical type base:json, which provides the client 140 the option to pick a field (e.g., out of a custom nested j son structure) that has to be indexed and define it as a separate field. The metadata associated with a field may be defined by the properties of the field including, for example, a name, a canonical type, a capability, a vector field indicator, a default value, and/or the like. Table 3 below includes examples of the various properties of a field.

TABLE 3

| Property | Description |
| --- | --- |
| Name | Label of the field. Should not contain any special characters. Should be unique across all the types of associated with a single tenant. |
| Canonical Type | Data type of the field. |
| Capability | Object that defines one or more capabilities of a field. A single field can have multiple capabilities. |
| Vector Field Indicator | Boolean value indicating whether a single document can contain multiple values in a single entry for a field. Default value is false. Not all capabilities can be applied to a vector field. |
| Default Value | The default value for a field if a value for the field is not passed during indexing. Should not be set to NULL value, which is the same as not indexing the field. |

The capability of a field may be an abstraction provided by the types controller 110 for generating the appropriate definitions for the search system 120. The search system 120 may impose limitations on the capabilities that may be added to each field in the custom type 250. Fields in tenant level types may have capabilities that are consistent with the search system 120. Fields in system level types may have implicit behavior defined by search system 120, which may include additional capabilities that the search system 120 supports but are not exposed to tenant level clients (e.g., the one or more clients 140). Table 4 below includes various examples of capabilities.

TABLE 4

| Capability | Description |
| --- | --- |
| Indexable | This capability, when set to true, causes the search system to index the field. Each field may be non-indexable by default. All fields that should be part of the search index should be indexable. |
| Free Text Search | This capability, when set to true, causes the search system to use this field in free text queries. Each field may not be available for free text search by default. Only fields of the type base:mls or base:string may have this capability. |
| Keyword | Fields that contain one word values and have requirement for exact match searches should have this capability set to true. The default is false. Indexing will be in the same case as value. |
| Type Ahead | This capability indicates that this field will be used for typeahead suggestions. The default value is false. |
| Hierarchical | This capability is set to true for fields with heirarchical values. Support is available only for those values having "I" as a separator. The client application is responsible for formatting the value prior to publication. Default value is false. |
| Geo Spatial Search | This capability may be set to true for fields containing longitudinal and/or latitudinal values. The default value is false. |
| Range | This capability may be set to true for fields that will be part of range queries. The default value is false. |
| Key | This capability, when set to true, indicates that the value in the field uniquely identifies a corresponding document across the index. Multiple fields in a single document may have this capability set to true. The default value is false. A field |

TABLE 4-continued

| Capability | Description |
|---|---|
|  | designated as containing a key value cannot be multivalued and cannot have vector property set to true. |
| Sortable | A field with this capability set to true may be sortable. A sortable fields cannot be multivalued. A field is by default not sortable. |
| Facetable | A field that is used for faceting may have this capability set to true. A field is by default not facetable. |
| Filterable | This capability, when set to true, allows the field to be referenced in filter queries. Fields with this capability set to true may not undergo tokenization similar to a searchable field. Comparisons may be performed for exact match. A field can be searchable as well as filterable. A field is by default not filterable. |

In some example embodiments, the types controller 110 may provide one or more pre-defined types. Accordingly, the custom type 250 may be defined based on a pre-defined type, in which case the custom type 250 may inherit from and/or extend the pre-defined type. By default, if the custom type 250 is defined based on the pre-defined type, the custom type 250 may inherit the fields included in the pre-defined type and may extend the pre-defined type by the addition of one or more fields. To further illustrate, Table 5 depicts an example of a pre-defined type "base:catalogitem."

Table 5
{
"type": "base:catalogitem",
"description": " ",
"fields": [
 {
  "name": "Key",
  "type": "base:string",
  "capabilities": {
   "indexAble": true,
   "key": true
  }
 }, {
  "name": "LeadTime",
  "type": "base:duration"
 },
 {
  "name": "ManufacturerPartId",
  "type": "base:partnumber",
  "capabilities": {
   "indexAble": true,
   "freeTextSearch": true,
   "keyword": true,
   "partialKeyword": true,
   "filterAble": true
  }
 },
 {
  "name": "ShortName",
  "type": "base:entext",
  "capabilities": {
   "indexAble": true,
   "freeTextSearch": true,
   "typeAhead": true,
   "facetAble": true,
   "filterAble": true
  }
 },
 {
  "name": "SupplierPartId",
  "type": "base:partnumber",
  "capabilities": {
   "indexAble": true,
   "freeTextSearch": true,
   "typeAhead": true,
   "keyword": true,
   "partialKeyword": true,
   "facetAble": true,
   "filterAble": true
  }
 },
 {
  "name": "Thumbnail",
  "type": "base:url"
 },
 {
  "name": "SupplierName",
  "type": "base:string",
  "capabilities": {
   "indexAble": true,
   "typeAhead": true,
   "freeTextSearch": true,
   "filterAble": true
  }
 }
]
}

Table 6 depicts another example of a pre-defined type "sellerdirect:catalogitem."

Table 6
{
"type": "sellerdirect:catalogitem",
"isCanonical": false,
"isPrimitive": false,
"tenantId": "sellerdirect",
"extends": "base:catalogitem",
"description": " ",
"fields": [
 {
  "name": "BrandName",
  "type": "base:i18nstring",
  "capabilities": {
   "indexAble": true,
   "typeAhead": true,
   "filterAble": true,
   "freeTextSearch": true
  }
 },
 {
  "name": "CommodityCode",
  "type": "base:string"
 },
 {
  "name": "CommodityCodeHierarchy",
  "type": "base:string",
  "vector": true,

```
    "capabilities": {
       "indexAble": true,
       "filterAble": true,
       "facetAble": true
    }
},
{
  "name": "Currency",
  "type": "base:currency",
  "capabilities": {
     "indexAble": true,
     "filterAble": true,
     "facetAble": true
  }
},
{
  "name": "Description",
  "type": "base:entext",
  "capabilities": {
     "indexAble": true,
     "typeAhead": true,
     "freeTextSearch": true
  }
},
  "name": "GroupId",
  "type": "base:string",
  "capabilities": {
     "indexAble": true,
     "facetAble": true,
     "filterAble": true
  }
},
{
  "name": "IsGreen",
  "type": "base:boolean",
  "capabilities": {
     "indexAble": true,
     "facetAble": true,
     "filterAble": true
  }
}
{
  "name": "IsHazardousMaterials", "type": "base:boolean", "capabilities": {"indexAble":true,"facetAble":true,"filterAble":true}
}
{
  "name": "IsReturnable",
  "type": "base:boolean",
  "capabilities": {"indexAble": true, "facetAble": true, "filterAble": true}
}
{
  "name": "ItemId",
  "type": "base:string",
  "capabilities": {
     "key": true,
     "indexAble": true,
     "facetAble": true,
     "filterAble": true
  }
},
{
  "name": "ItemRanking",
  "type": "base:double",
  "capabilities": {
     "indexAble": true,
     "facetAble": true,
     "filterAble": true,
     "range": true
  }
},
{
  "name": "ItemVersion",
  "type": "base:string"
},
{
  "name": "ItemSpec",
  "type": "base:string"
},
{
  "name": "ManufacturerName",
  "type": "base:i18nstring",
  "capabilities": {
     "indexAble": true,
     "freeTextSearch": true,
     "facetAble": true,
     "filterAble": true,
     "keyword": true
  }
},
{
  "name": "ManufacturerPartNumber",
  "type": "base:partnumber",
  "capabilities": {
     "indexAble": true,
     "freeTextSearch": true,
     "facetAble": true,
     "filterAble": true
  }
},
{
  "name": "MarketPrice",
  "type": "base:double",
  "capabilities": {
     "indexAble": true,
     "filterAble": true,
     "facetAble": true,
     "range": true
  }
},
{
  "name": "NumberOfReviews",
  "type": "base:int",
  "capabilities": {
     "indexAble": true,
     "facetAble": true,
     "filterAble": true,
     "range": true
  }
},
{
  "name": "QuantityAvailable",
  "type": "base:long",
  "capabilities": {
     "indexAble": true,
     "filterAble": true,
     "facetAble": true,
     "range": true
  }
}
{
  "name": "QuantitySold",
```

```
"type": "base:long",
"capabilities": {
  "indexAble": true,
  "filterAble": true,
  "facetAble": true,
  "range": true
    }
  }
},
{
"name": "SupplierName",
"type": "base:i18nstring",
"capabilities": {"indexAble": true, "freeTextSearch":
    true, "facetAble": true, "filterAble": true, "typeA-
    head": true
    }
},
{
"name": "SupplierAnId", "type": "base:string", "capa-
    bilities": {
  "indexAble": true,
  "facetAble": true,
"filterAble": true
    }
},
{
"name": "SupplierPartAuxId",
"type": "base:partnumber", "capabilities": {
  "indexAble": true,
  "freeTextSearch": true,
  "facetAble": true,
  "filterAble": true
    }
},
{
"name": "StarRatings",
"type": "base:double",
"capabilities": {
  "indexAble": true,
  "filterAble": true,
  "facetAble": true,
  "range": true
    }
},
{
"name": "Uom",
"type": "base:string", "capabilities": {
  "indexAble": true,
  "filterAble": true,
  "facetAble": true
    }
},
{
"name": "UidCode",
"type": "base:partnumber",
"capabilities": {
  "indexAble": true,
  "filterAble": true,
  "facetAble": true
    }
},
{
"name": "UidType",
"type": "base:string",
"capabilities": {
  "indexAble": true,
  "filterAble": true,
  "facetAble": true
    }
},
{
"name": "UnitPrice",
"type": "base:double",
"capabilities": {
  "indexAble": true,
  "filterAble": true,
  "facetAble": true,
  "range": true
    }
},
{
"name": "Language",
"type": "base:lang"
    }
  ]
}
```

In some example embodiments, the types controller 110 may support updates including, for example, the addition and/or removal of a field from the custom type 250. A type updates that is backward compatible, such as the addition of a field to the custom type 250, may be implemented immediately, for example, on documents published in accordance with the custom type 250 subsequent to the update. Contrastingly, a backward incompatible update, such as the deletion of a field from the custom type 250 and/or some modifications to the definition of a field, may trigger a re-indexing process at the search system 120.

As noted, the addition of a field to the custom type 250 may be backward compatible. Adding the field to the custom type 250 may not require a re-indexing of the documents published in accordance to the custom type 250 without the added field. Moreover, the update with the addition of the field may be implemented immediately such that all documents that are pending publication during the update and subsequent to the update may be published to the search system 120 with the new field. If a documents does not include a value for the new field, a default value may be added to the index if the field is defined with the default capability set to true.

In some example embodiments, changes to the definition of an existing field in the custom type 250 may be initiated by the client application 145 or an administrator. Table 7 below illustrates how the types controller 110 may respond to different changes to the definition of an existing field.

TABLE 7

| Property | Old Value | New Value | Feature Supported | Backward Compatibility |
|---|---|---|---|---|
| Name | fieldname | newFieldName | No | Application should do full re publish by creating a new type. Not supported in version 1 |
| Type | Type-1 (Ex: String) | Type-2 (Ex: int) | No | Application should do full re publish by creating a new type. Not supported in version 1 |

TABLE 7-continued

| Property | Old Value | New Value | Feature Supported | Backward Compatibility |
|---|---|---|---|---|
| Keyword | True/False | False/True | Yes | Service will make the decision. If re-indexing is required it will return appropriate response (will be decided based on re-index design). If re-indexing is not required then change will be accepted and normal publish will continue. |
| Free Text Search | True/False | False/True | Yes | Service will make the decision. If re-indexing is required it will return appropriate response (will be decided based on re-index design). If re-indexing is not required then change will be accepted and normal publish will continue. |
| Indexable | True/False | False/True | Yes | Service will make the decision. If re-indexing is required it will return appropriate response (will be decided based on re-index design). If re-indexing is not required then change will be accepted and normal publish will continue. |
| Sortable | True/False | False/True | Yes | Service will make the decision. If re-indexing is required it will return appropriate response (will be decided based on re-index design). If re-indexing is not required then change will be accepted and normal publish will continue. |
| Type Ahead | True/False | False/True | Yes | Service will make the decision. If re-indexing is required it will return appropriate response (will be decided based on re-index design). If re-indexing is not required then change will be accepted and normal publish will continue. |
| Vector | True/False | False/True | No | Application should do full re publish by creating a new type. Not supported in version 1 |
| Facetable | True/False | False/True | Yes | Service will make the decision. If re-indexing is required it will return appropriate response (will be decided based on re-index design). If re-indexing is not required then change will be accepted and normal publish will continue. |
| Hierarchical | True/False | False/True | Yes | Service will make the decision. If re-indexing is required it will return appropriate response (will be decided based on re-index design). If re-indexing is not required then change will be accepted and normal publish will continue. |
| Geo Spatial Search | True/False | False/True | Yes | Service will make the decision. If re-indexing is required it will return appropriate response (will be decided based on re-index design). If re-indexing is not required then change will be accepted and normal publish will continue. |
| Type Ahead | True/False | True/False | Yes | Service will make the decision. If re-indexing is required it will return appropriate response (will be decided based on re-index design). If re-indexing is not required then change will be accepted and normal publish will continue. |
| Filterable | True/False | False/True | Yes | Service will make the decision. If re-indexing is required it will return appropriate response (will be decided based on re-index design). If re-indexing is not required then change will be accepted and normal publish will continue. |

In some example embodiments, each field of the custom type 250 may be defined to have a canonical type specified, for example, by a user of the client 140. In addition to one or more predefined types (e.g., base:catalogitem, sellerdirect:catalogitem, and/or the like), the types controller may also provide one or more canonical types for selection by the user. Examples of canonical types include primitive canonical types such as Boolean, currency, date, double, float, integer, long value, part number, string, email, and/or the like. Examples of canonical types also include complex canonical types such as domain value, duration, image, point, entext, price, universal resource locator, address, and/or the like.

The primitive canonical type Boolean may be used for fields containing Boolean values. Fields having the primitive canonical type Boolean may support capabilities such as indexing and filtering but enabling other capabilities on a field having the primitive canonical type Boolean may cause the types controller 110 to return a validation error. Table 8 below depicts an example of a model for the primitive canonical type Boolean.

Table 8
{
  "type": "base:boolean",
  "isprimitive": true,
  "primitivetype": "boolean",
  "description": " "
}

The primitive canonical type currency may be used for fields representing currency codes such as, for example, USD, INR, and/or the like. Fields having the primitive canonical type currency may support capabilities such as indexing and filtering. Table 9 below depicts an example of a model for the primitive canonical type currency.

Table 9
{
  "type": "base:currency",
  "isprimitive": true,
  "primitivetype": "string",
  "description": " "
}

The primitive canonical type date may be used for fields containing date values. Fields having the primitive canonical type date may support capabilities such as indexing, filtering, faceting, range, and sorting but should not be multivalued. Moreover, to enable one or more of the supported capabilities on a field having the primitive canonical type date may require the capabilities to be enabled through the client application 145. Enabling a non-supported capability may cause the types controller 110 to return a validation error. Table 10 below depicts an example of a model for the primitive canonical type date.

Table 10
{
  "type": "base:date",
  "isprimitive": true,
  "primitivetype": "date",
  "description": " "
}

The primitive canonical type double may be used for fields containing double values. Fields having the primitive canonical type double may support capabilities such as indexing, sorting, range, and filtering. However, enabling one or more of the supported capabilities on a field having the primitive canonical type double may require the capabilities to be enabled through the client application 145. Moreover, enabling a non-supported capability may cause the types controller 110 to return a validation error. Table 11 below depicts an example of a model for the primitive canonical type double.

Table 11
{
  "type": "base:double",
  "isprimitive": true,
  "primitivetype": "double",
  "description": " "
}

The primitive canonical type float may be used for fields containing floating values. Fields having the primitive canonical type float may support capabilities such as indexing, sorting, range, and filtering. However, enabling one or more of the supported capabilities on a field having the primitive canonical type float may require the capabilities to be enabled through the client application 145. Moreover, enabling a non-supported capability may cause the types controller 110 to return a validation error. Table 12 below depicts an example of a model for the primitive canonical type float.

Table 12
{
  "type": "base:float",
  "isprimitive": true,
  "primitivetype": "float",
  "description": " "
}

The primitive canonical type integer may be used for fields containing integer values. Fields having the primitive canonical type integer may support capabilities such as indexing, sorting, range, and filtering. However, enabling one or more of the supported capabilities on a field having the primitive canonical type integer may require the capabilities to be enabled through the client application 145. Moreover, enabling a non-supported capability may cause the types controller 110 to return a validation error. Table 13 below depicts an example of a model for the primitive canonical type integer.

Table 13
{
  "type": "base:int",
  "isprimitive": true,
  "primitivetype": "int",
  "description": " "
}

The primitive canonical type long may be used for fields containing long values. Fields having the primitive canonical type long may support capabilities such as indexing, sorting, range, and filtering. However, enabling one or more of the supported capabilities on a field having the primitive canonical type long may require the capabilities to be enabled through the client application 145. Moreover, enabling a non-supported capability may cause the types controller 110 to return a validation error. Table 14 below depicts an example of a model for the primitive canonical type long.

Table 14
{
  "type": "base:long",
  "isprimitive": true,
  "primitivetype": "long",
  "description": " "
}

The primitive canonical type part number may be used for fields containing part numbers (or identifiers). Fields having the primitive canonical type part number may support capabilities such as indexing, filtering, keyword, and free text search. However, enabling one or more of the supported capabilities on a field having the primitive canonical type part number may require the capabilities to be enabled through the client application 145. Moreover, enabling a non-supported capability may cause the types controller 110 to return a validation error. Table 15 below depicts an example of a model for the primitive canonical type part number.

Table 15
{
  "type": "base:partnumber",
  "isprimitive": true,
  "primitivetype": "string",
  "description": " "
}

The primitive canonical type string may be used for fields in a string format and containing non-internationalized strings (of a maximum size of 48 characters). Fields having the primitive canonical type string may support capabilities such as indexing, free text search, hierarchy, type ahead, faceting, filtering, keyword, and sorting (e.g., when vector value is false). However, enabling one or more of the supported capabilities on a field having the primitive canonical type string may require the capabilities to be enabled through the client application 145. Moreover, enabling a non-supported capability may cause the types controller 110 to return a validation error. Table 16 below depicts an example of a model for the primitive canonical type string.

Table 16
{
  "type": "base:string",
  "isprimitive": true,
  "primitivetype": "string",
  "description": " ",
  "i18n": false
}

The primitive canonical type i18nstring may be used for fields in a string format and containing internationalized strings (of a maximum size of 48 characters). Fields having the primitive canonical type i18nstring may support capabilities such as indexing, free text search, hierarchy, type ahead, faceting, filtering, keyword, and sorting (e.g., when vector value is false). However, enabling one or more of the supported capabilities on a field having the primitive canonical type i18nstring may require the capabilities to be enabled through the client application 145. Moreover, enabling a non-supported capability may cause the types controller 110 to return a validation error. Table 17 below depicts an example of a model for the primitive canonical type i18nstring.

Table 17
```
{
  "type": "base:i18nstring",
  "isprimitive": true,
  "primitivetype": "string",
  "description": " ",
  "i18n": true
}
```

The primitive canonical type email may be used for fields containing email values such as strings ending in "@<domain>.com." Fields having the primitive canonical type email may support capabilities such as indexing, keyword, and type ahead. However, enabling one or more of the supported capabilities on a field having the primitive canonical type email may require the capabilities to be enabled through the client application 145. Moreover, enabling a non-supported capability may cause the types controller 110 to return a validation error. Table 18 below depicts an example of a model for the primitive canonical type email.

Table 18
```
{
  "type": "base:email",
  "isprimitive": true,
  "primitivetype": "string",
  "description": " "
}
```

Fields having the complex canonical type domain value may support capabilities such as indexing, type ahead, filtering, and faceting. Enabling one or more of the supported capabilities on a field having the complex canonical type domain value may require the capabilities to be enabled through the client application 145. The capability for type ahead may be performed on the value field of the complex domain type domain value. Moreover, fields having the complex canonical type domain value may, by default, support indexing, filtering, and faceting. Enabling other, non-supported capabilities on a field having the complex canonical type domain value may cause the types controller 110 to return a validation error. Table 19 below depicts an example of a model for the complex canonical type domain value.

Table 19
```
{
  "type": "base:domainvalue",
  "description": " ",
  "fields": [
    {
      "name": "domain",
      "type": "base:string"
    },
    {
      "name": "value",
      "type": "base:string"
    }
  ]
}
```

Fields having the complex canonical type duration may support capabilities such as indexing, filtering, and range. Enabling one or more of the supported capabilities on a field having the complex canonical type duration may require the capabilities to be enabled through the client application 145. The capability for range may be performed on the value field of the complex domain type duration. Enabling other, non-supported capabilities on a field having the complex canonical type duration may cause the types controller 110 to return a validation error. Table 20 below depicts an example of a model for the complex canonical type duration.

Table 20
```
{
  "type": "base:duration",
  "description": "when defining lead time you need to know days, weeks",
  "fields": [
    {
      "name": "interval",
      "type": "base:string",
      "default": "day"
    },
    {
      "name": "value",
      "type": "base:string"
    }
  ]
}
```

Fields having the complex canonical type image may contain image data and/or links to images (e.g., universal resource locators (URLs) and/or the like. Table 21 below depicts an example of a model for the complex canonical type image.

Table 21
```
{
  "type": "base:image",
  "description": " ",
  "fields":[
    {
      "name": "link",
      "type": "base:string"
    }
  ]
}
```

Fields having the complex canonical type point may support capabilities such as indexing and geo spatial search. Enabling one or more of the supported capabilities on a field having the complex canonical type point may require the capabilities to be enabled through the client application 145. Enabling other, non-supported capabilities on a field having the complex canonical type point may cause the types controller 110 to return a validation error. Table 22 below depicts an example of a model for the complex canonical type point.

Table 22
```
{
  "type": "base:point",
  "description": "Type for points",
  "fields": [
    {
      "name": "x",
      "type": "base:long"
    },
    {
      "name": "y",
      "type": "base:long"
    }
  ]
}
```

The complex canonical type entext may be used for fields containing freely flowing text from, for example, a description, a page, a story, and/or the like. Fields having the complex canonical type entext may support capabilities such as indexing, free text search, and type ahead. Enabling one or more of the supported capabilities on a field having the complex canonical type entext may require the capabilities to be enabled through the client application 145. Enabling other, non-supported capabilities on a field having the complex canonical type entext may cause the types controller 110 to return a validation error. Table 23 below depicts an example of a model for the complex canonical type entext.

Table 23
```
{
  "type": "base:entext",
  "description": "language dependent string",
  "i18n"
  "fields": [
    }
      "name": "text",
      "type": "base:string"
    }
  ]
}
```

Fields having the complex canonical type price may support capabilities such as indexing, filtering, faceting, and range. The capability range may be performed on the amount field of fields having the complex canonical type price. Enabling one or more of the supported capabilities on a field having the complex canonical type price may require the capabilities to be enabled through the client application 145. Enabling other, non-supported capabilities on a field having the complex canonical type price may cause the types controller 110 to return a validation error. Table 24 below depicts an example of a model for the complex canonical type price.

Table 24
```
{
  "type": "base:price",
  "description": " ",
  "fields": [
    {
      "name": "currency",
      "type": "base:currency"
    },
    {
      "name": "amount",
      "type": "base:double"
    }
  ]
}
```

The complex canonical type universal resource locator (URL) may be used for fields containing links to various resources such as webpage links, universal resource links, punch out universal resource links, and/or the like. Fields having the complex canonical type universal resource locator may support capabilities such as indexing and free text search. Enabling one or more of the supported capabilities on a field having the complex canonical type universal resource link may require the capabilities to be enabled through the client application 145. Enabling other, non-supported capabilities on a field having the complex canonical type universal resource link may cause the types controller 110 to return a validation error. Table 25 below depicts an example of a model for the complex canonical type universal resource link.

Table 25
```
{
  "type": "base:url",
  "description": " ",
  "fields":[
    {
      "name": "link",
      "type": "base:string"
    }
  ]
}
```

Fields having the complex canonical type address may support capabilities such as indexing, faceting, type ahead, and geospatial search. The capability for geospatial search may be performed on fields containing values corresponding to city, postal code, country, and state. The capabilities for type ahead and faceting may be performed on fields containing data corresponding to city, country, and state. The capability for indexing may be performed on all fields having the complex canonical type address. Enabling one or more of the supported capabilities on a field having the complex canonical type address may require the capabilities to be enabled through the client application 145. Enabling other, non-supported capabilities on a field having the complex canonical type address may cause the types controller 110 to return a validation error. Table 26 below depicts an example of a model for the complex canonical type address.

Table 26
```
  "type": "base:address",
  "description": " ",
  "fields": [{
      "name": "line1",
      "type": "base:string"
    }, {
      "name": "line2",
      "type": "base:string"
    }, {
      "name": "line3",
      "type": "base:string"
    }, {
      "name": "city",
      "type": "base:string"
    }, {
      "name": "state",
      "type": "base:string"
    }, {
      "name": "postalcode",
      "type": "base:string"
    }, {
      "name": "country",
      "type": "base:string"
    },{
      "name": "phone",
      "type": "base:string"
    }, {
      "name": "fax",
      "type": "base:string"
    } ]
}
```

In some example embodiments, the types controller 110 may support updates to the custom type 250. The types controller 110 may validate the request to update the type and determine whether the update is backward compatible or backward incompatible. If the update is backward compatible, the types controller 110 may consume the request. Alternatively, if the update is backward incompatible, the types controller 110 may trigger, at the search system 120, a re-indexing background process.

In the event the update is backward compatible and compatible with updates already in progress, the types controller 110 may determine whether the update necessitates a re-indexing of the existing documents having the same type. If the update requires a re-indexing, the types controller 110 may maintain the update in an inactive state until the publish microservice 144 completes the re-indexing and switches to the new index. In the meantime, the types controller 110 may resolve all requests for the type on the version of the type that is in the active state.

Figure 3:
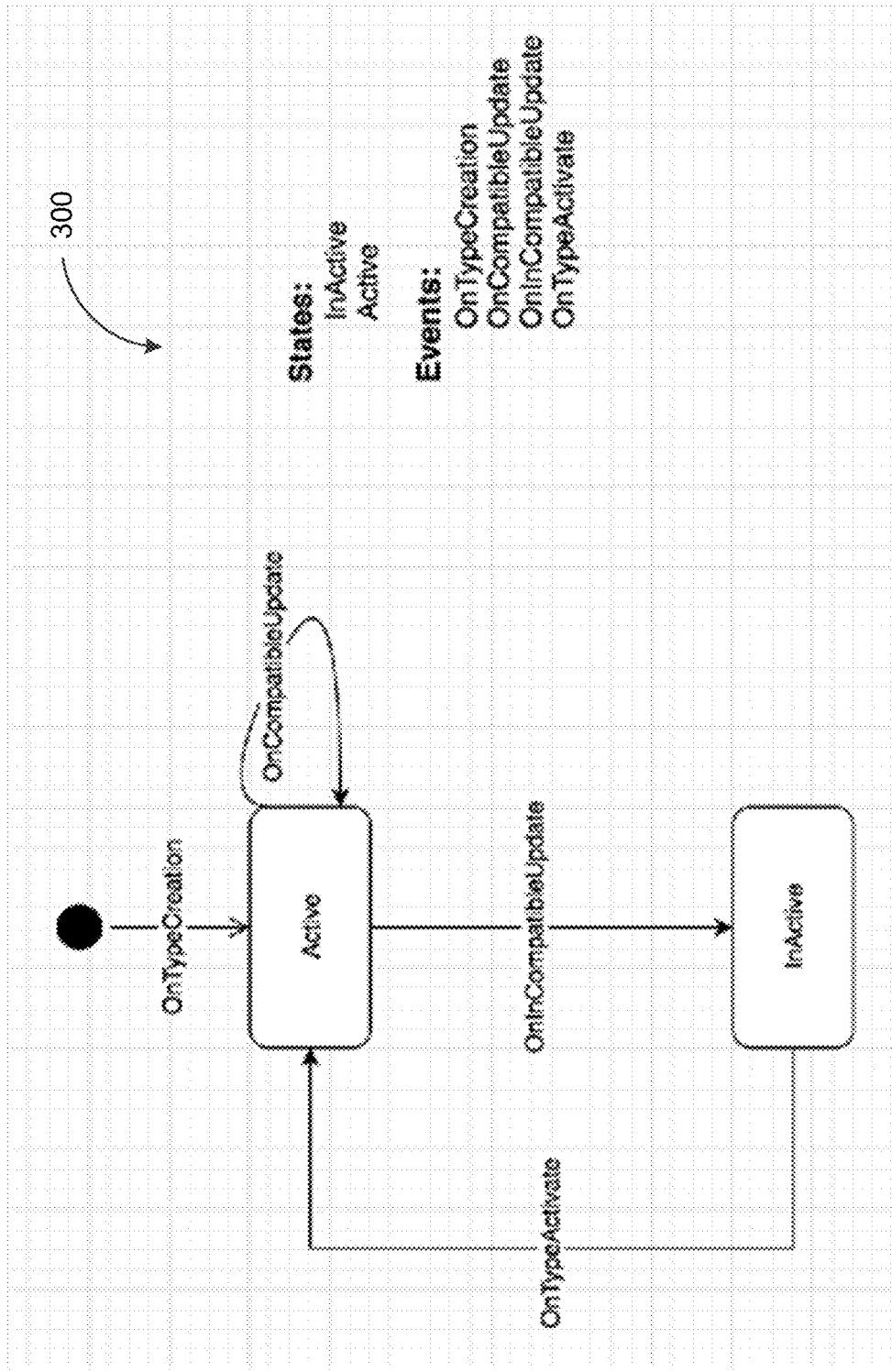
FIG. 3 depicts a state diagram illustrating an example of a process for updating a type, in accordance with some example embodiments.

FIG. 3 depicts a state diagram illustrating an example of a process 300 for updating a type, in accordance with some example embodiments. The types controller 110 may maintain the state for updates that require a full re-indexing in order to maintain consistency in the state of the search system 100. Accordingly, in response to detecting an incompatible update to the custom type 250, the types controller 110 may transition the custom type 250 from an active state to an inactive state. While the custom type 250 remains in the inactive state, for example, pending the re-indexing, the types controller 110 may reject further updates to the custom type 250, whether those updates are backward compatible or backward incompatible. Moreover, prior to the re-indexing and while the custom type 250 remains in the inactive state, requests for the custom type 250 may be executed based on the current version of the custom type 250 without the update. The types controller 110 may notify the publish microservice 134 to perform a re-indexing based on the update to the custom type 250. Once the publish microservice 134 completes the re-indexing, the publish microservice 134 may notify the types controller 110 such that the types controller 110 may transition the updated version of the custom type 250 from the inactive state to the active state.

As noted, the user may define the custom type 250 to include multiple fields, each of which having a user selectable canonical type (e.g., primitive canonical type, complex canonical type, and/or the like) and one or more user selectable capabilities. In some example embodiments, each field in the custom type 250 may also be associated with a groups attribute. The groups attribute associated with a field may be defined by the search system 120 in order to categorize the field based on one or more common criteria. The groups attribute associated with a field may further define at least some behavior exhibited by the field.

Groups may generally be defined within the canonical primitive type. All of the fields from a custom type may be assigned a default groups behavior defined in canonical primitive type. However, groups attributes on fields in out-of-box system types (e.g., base:catalogitem, sellerdirect:catalogitem) may be overridden based on the feedback cycle of relevancy measurements either automatically or manually by administrators of the search system 120. Groups may also be defined based on the canonical types of the fields based, for example, on the corresponding capabilities of the fields. Examples of groups may include an index group with fields that require indexing (e.g., by the search microservice 132), an expand group with fields that require enrichment (e.g., by the publish microservice 134) as part of publishing the corresponding documents, a mapping group with fields that require mapping to a target field having a different format, and a typeahead group with fields that are part of the typehead index and used for typeahead suggestions. To further illustrate, Table 27 below depicts an example of a definition of a group.

Table 27
"groups": [
{
"name": "index",
"view": "index",
"method": "text",
"capabilities": ["searchable", "freeTextSearch"]
}
"dynamic": {
"class": "ariba.ads.util.core.type.dynamic.StringConcat",
'delimeter': ':',
"input":[".domain", ".realm", ".value"]
}
]

Referring to Table 27, the definition of a group may include name indicating the type of the group (e.g., index group, expand group, mapping group, or typeahead group). The definition of the group may also include a view used to generate a projection of the corresponding fields from a schema. For example, the definition of an index group that includes fields that require indexing (e.g., by the search microservice 132) may include a projection of the fields used to form the search index. As shown in Table 27, the definition of the group may also include a method defining a mapping between capability to analyzer, which includes the logic to parse content into different representations in the search index. The definition of the group may further include an array of capabilities. This group may be assigned to and/or enabled on a field if there is a capability enabled on the field that is present in the list of capabilities defined on the group. This functionality enables the definition of different analytical transformation for same field and capability combination. Different attributes may be added to and/or updated for a particular group to provide extra information available during query work flow.

As shown in Table 27, in some example embodiments, the types controller 110 may support dynamic fields. Accordingly, if a field in the custom type 250 is defined as dynamic (e.g., having a dynamic attribute), a value for the field may be computed dynamically based on the definition associated with the custom type 250 (e.g., type JSON) if a value is not present for the field. The computation for the value of the field may accept input parameters.

Table 28 below depicts an example of a definition for a dynamic field. In the example of the dynamic field definition shown below, the "id" field may be specified as dynamic. As such, the value of the "id" field may be calculated dynamically by the class StringConcat, with the inputs and other parameters required for the calculation being supplied by the type JSON.

Table 28
{
"type": "base:id",
"description": " ",
"fields": [
{
"name": "domain",
"type": "base:string"
},
{
"name": "value",
"type": "base:string"
},
{
"name": "realm",
"type": "base:string"
},
{
"name": "id",
"groups": [{
"name": "id",
"view": "index",
"method": "id"
}
]
,
"type": "base:string",

```
        "dynamic": {
            "class":    "ariba.ads.util.core.type.dynamic.String-
                Concat",
    "delimiter":":",
        "input":[".domain", ".realm", ".value"]
            }
        }]
}
```

FIG. 4A depicts a sub section of a final schema that may be understood by an underlying indexing tool (e.g., at the search system 120). One or more fields may be defined dynamically and directly, for example, at the client 140 using this tool. The types controller 110 may be configured to assert control over these dynamically defined fields and provide relevancy improvements. For example, the ability to define dynamic fields using the tools at the search system 120 may be limited to administrators of the search system 120. An example of such a definition is shown in the FIG. 4A. Moreover, the types controller 110 may provide an ability to define custom types containing client level fields as well as a mechanism to convert fields defined by the client 140 to one or more dynamic fields as shown in FIG. 4A. The concept of groups and the corresponding methods may be extended to the conversion of client fields to one or more dynamic fields.

Figure 4B:
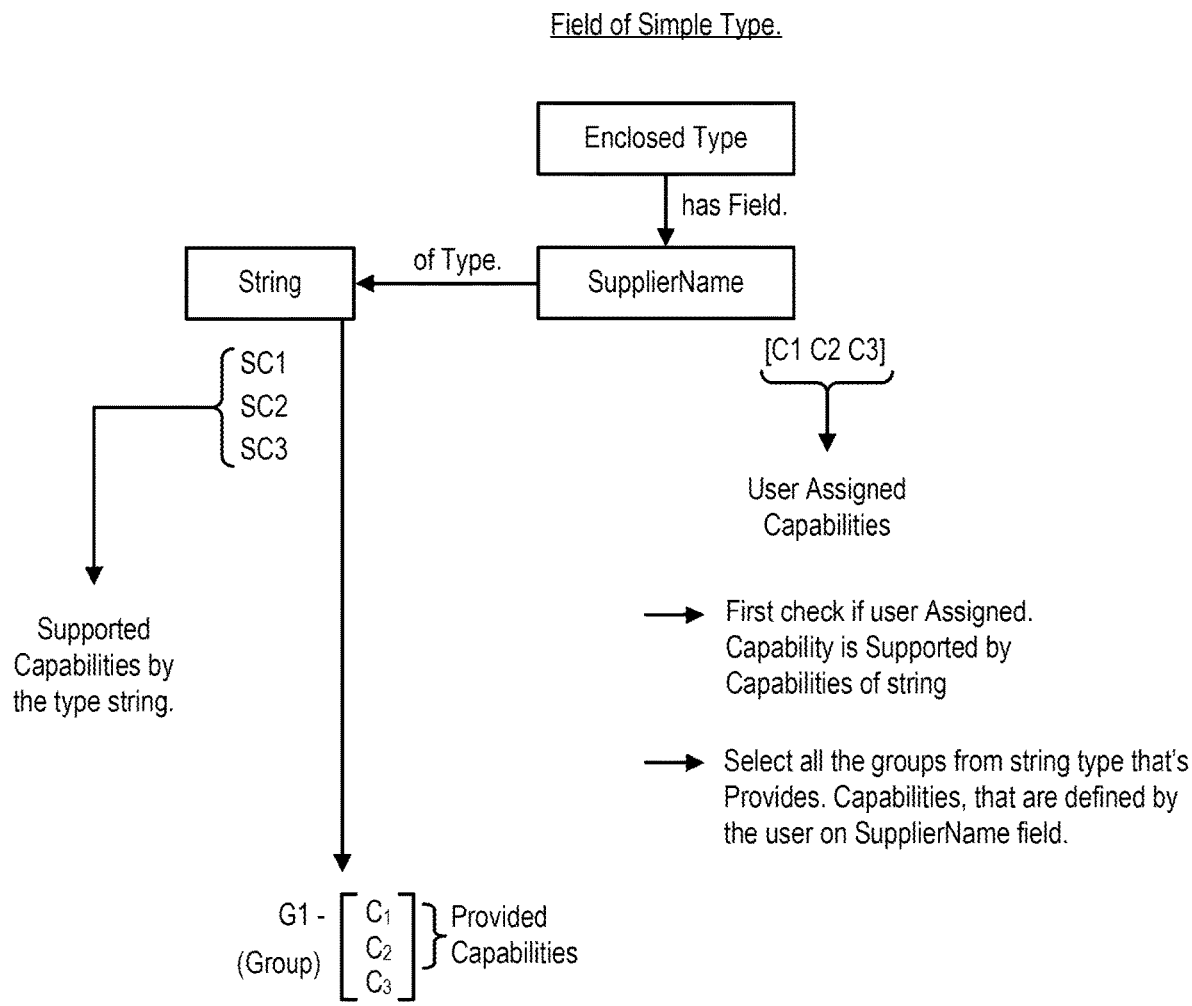
FIG. 4B depicts a schematic diagram illustrating an example of a mapping to derive a group for a field of a simple type, in accordance with some example embodiments.
Figure 4C:
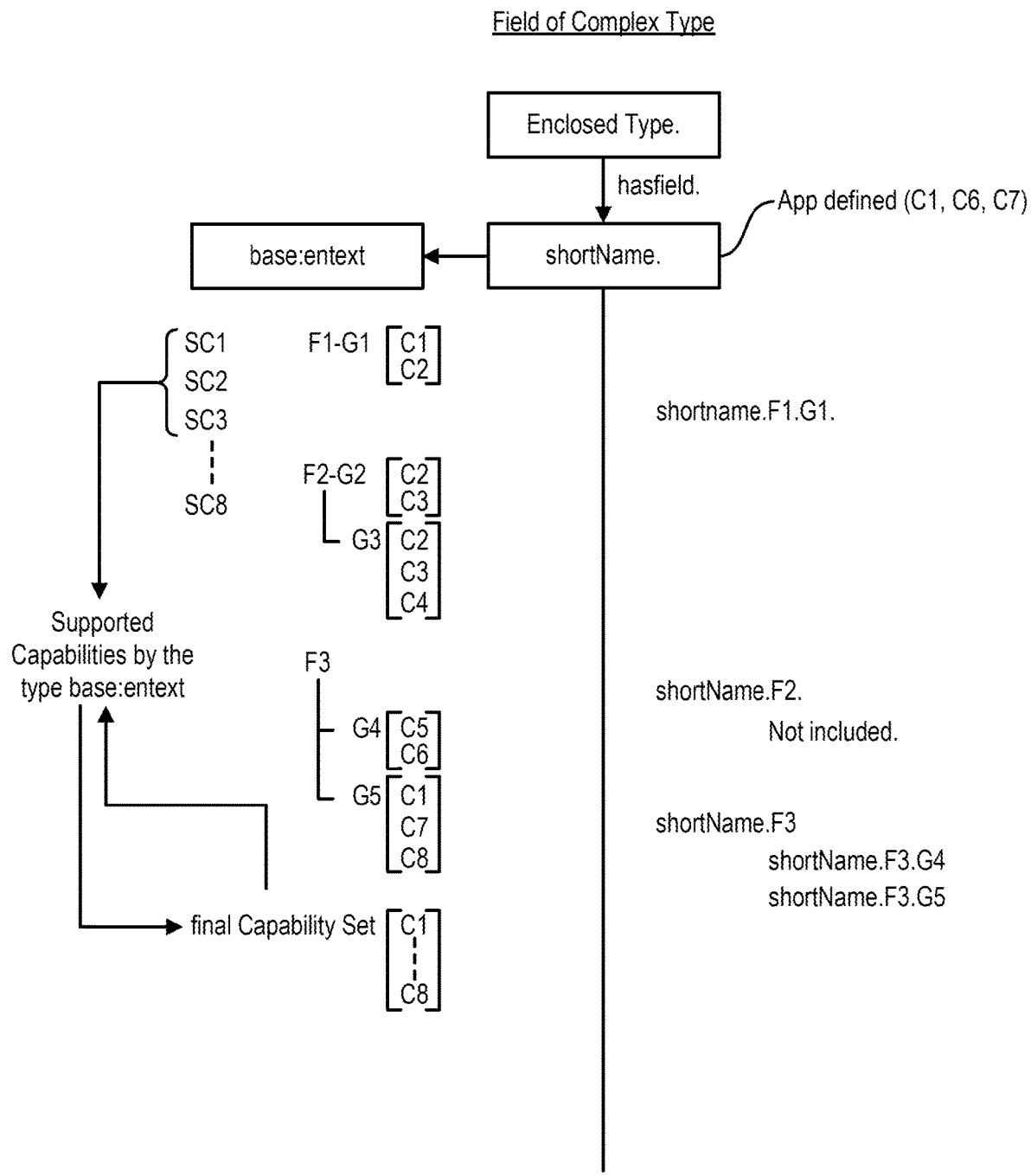
FIG. 4C depicts a schematic diagram illustrating an example of a mapping to derive a group for a field of a complex type, in accordance with some example embodiments.

In some example embodiments, a group of fields of a simple type or a group of fields of a complex type may be derived by mapping. The grouping may be performed as part of enriching a field defined by a user to include one or more additional fields. A simple type may be associated with one or more group definitions whereas a complex type may include nested group definitions in which one or more constituent fields are associated with additional group definitions. To further illustrate, FIG. 4B depicts a schematic diagram illustrating an example of a mapping to derive a group for a field of a simple type while FIG. 4C depicts a schematic diagram illustrating an example of a mapping to derive a group for a field of a complex type. Referring to FIGS. 4B-C, each field may have a reference "ofType," which may indicate an "is-a" relationship to a canonical type. That same field may also be part of an 'Enclosing Type' definition, where that Type "hasField" may reference this field. It should be appreciated that a field may not have a capability-set above and beyond what is defined by its canonical type.

To derive a group for a field F (e.g., the field Supplier-Name in FIGS. 4B-C), the types controller 110 may determine whether the capabilities assigned to the field F are supported by the canonical type (e.g., the type base:string in FIGS. 4B-C). This check may be performed whether the field F is part of a simple type or a complex type. For example, the user may require, for the field F, the capabilities $C_1$, $C_2$, and $C_3$. Deriving a group for the field F may include the types controller 110 identifying the groups associated with the canonical type that provides the capabilities $C_1$, $C_2$, and $C_3$ specified by the user.

In the example shown in FIG. 4B, the canonical type T may be a simple type supporting the capabilities [$SC_1$, $SC_2$, $SC_3$, $SC_4$]. The fields included in the canonical type may be grouped based on common capabilities. As such, the canonical type may also be associated with the group definitions $G_1$=[$C_1$, $C_3$], $G_2$=[$C_2$], $G_3$=[$C_3$], $G_4$=[$C_1$, $C_2$], and $G_5$=[$C_4$]. The field F may therefore be mapped, based on the capabilities assigned to the field F and the capabilities of each group associated with the canonical type, to groups $G_1$, $G_2$, $G_3$, and $G_4$.

Referring to FIG. 4C, the canonical type (e.g., the type base:entext) may be a complex type having multiple fields (e.g., $F_1$, $F_2$, $F_3$, $F_4$, and/or the like), each of which having its own structures of groups and supported capabilities. As such, the set of supported capabilities of the canonical type (e.g., the type base:entext) may correspond to union of the supported capabilities provided by the groups of constituent fields. In the event the user requires the field F to have the capabilities $C_1$, $C_6$, and $C_7$, the types controller 110 may determine the union of the supported capabilities provided by the fields of the canonical type. For example, the fields of the canonical type may be associated with the group definitions shown below, the union of which yielding the capabilities [$SC_1$, $SC_2$, $SC_3$, ..., $SC_8$] of the canonical type.

$F_1$: $G_1$=[$C_1$, $C_2$]
$F_2$: $G_2$=[$C_2$, $C_3$], $G_3$=[$C_2$, $C_3$, $C_4$]
$F_3$: $G_4$=[$C_5$, $C_6$], $G_5$=[$C_1$, $C_7$, $C_8$]
$F_4$: ...

Given the foregoing group definitions, the groups matching the capabilities required for the field F may include groups $G_1$, $G_4$, and $G_5$. The field F may therefore be mapped to groups $G_1$, $G_4$, and $G_5$. As shown in FIG. 4C, the group membership of the field F, which may be denoted as [fieldName.typeFieldName.groupName], may include shortName.F1.G1, shortName.F3.G4, shortName.F3.G5. The groups associated with the field $F_2$ may be excluded because the field $F_2$ does not contribute any of the capabilities required for the field F.

As noted, a document corresponding to an item may be published, for example, to the search system 120. Publishing a document according to a type may lend structure to at least a portion of the data included in the document. In some example embodiments, the flow to publish a document may be a streaming pipeline. For example, as shown in FIGS. 1A-B, the client 140 may push, to the stream processing system 136, a document containing a payload attribute along with other meta data properties. The payload attribute may contain, in a data interchange format such as JavaScript Open Notation (JSON) format, an object that is defined, at the types controller 110, as a type. The client 140, for example, the client application 145, may provide a type identifier (e.g., a type name) in the payload as part of the type attribute. The publish microservice 134 may receive, from the stream processing system 136, a payload including the document having the type for publication. Table 29 below depicts another example of a type.

Table 29
"type": "sellerdirect:hardware", // New type client app is requesting to create
"extends":  "sellerdirect:catalogitem", //Existing type from which this type will extend and this type will get all the fields from its parent type too.
"tenantId": "bayor",
"description": " ",
"fields": [
    {
        "name": "Color",
        "type": "base:string",
        "capabilities": {
            i n d e x A b l e" : t r u e ,
            "f a c e t A b l e" : t r u e ,
            "f i l t e r A b l e" : t r u e}
        },
    {
        "name": "Size",
        "type": "base:string",
        "capabilities": {

```
        "indexAble": true,
        "facetAble": true,
        "filterAble": true
        }
    }
  }
]
}
```

Table 30 below depicts an example of a payload for a document having the example of the type shown in Table 29.

Table 30
```
{
  "active": true,
  "green": true,
  "returnable": true,
  "uidCode": "92447001900",
  "uidType": "UPC",
  "TenantId": "bayor",
  "BrandName": "Lathem",
  "CommodityCodeHierarchy": [
    "20202502",
    "202025",
    "2020",
    "20"
  ],
  "CommodityCode": "20202502",
  "SubscriptionBaseId": "AN123",
  "type": "sellerdirect:hardware",
  "Color":"black",
  "Size": "36 in (diameter)",
  "Currency": "USD",
  "Description": {
  "text": "A basic, yet state-of-the-art time recorder Great for any small business. Features automatic True—
Align printing technology to eliminate misprinting. Also with direct thermal printing to eliminate the need for ribbons and ink. Keeps time and settings during power loss and equipped with Automatic Daylight Savings Time change. Prints day of week and time (AM/PM or 24 hour).",
    "lang": "en"
  },
  "Thumbnail": {
  "link": "https://www.idproducts.com/media/catalog/product/cache/3/image/730x/9df78eab33525d08d6e5fb8d27136e95/2/0/2000_1020582222.jpg"
  },
  "IsReturnable": true,
  "LeadTime": {
  "duration": "3"
  },
  "IsGreen": true,
  "ItemId": "AN123456799123|200||en|US",
  "Language": "en",
  "ManufacturerName": "Lathem",
  "ManufacturerPartNumber": "800P",
  "MarketPrice": 15,
  "QuantityAvailable": 1000,
  "SupplierName": "AN123",
  "SupplierAnId": "AN123",
  "Uom": "EA",
  "UnitPrice": 14.99,
  "ShortName": {
    "text": "Lathem Time 800P Direct Thermal-Print Time Clock, Charcoal Gray", "lang": "en"
  },
  "SupplierPartId": "100",
  "ItemVersion": 0,
  "delete": false,
  "UidCode": "92447001900",
  "ItemRanking": "1.0",
  "UidType": "UPC",
  "ItemSpec": "LED indicator=yes;automatic activation=yes;automatic card alignment=yes;automatic date/time adjustments=no;battery backup=yes;brand name=Lathem; color=Charcoal Gray;construction=metal;digital display=yes; dimensions=2.875 in;duty cycle=heavy duty; manufacturer=Lathem Time;memory backup length=5 years;model name=800P; mounting hardware included=yes;number of employees=unlimited;number of print formats=4;password protection=no; postconsumer recycled content=0%;reporting period=weekly;time clock application=payroll;time clock printer type=thermal;time clock type=electronic;total recycled content=0%;warranty length=1-year limited"
}
```

In order to publish the document having the payload shown in Table 29 and the type shown in Table 30, the publish microservice 134 may resolve the payload of the document based on the type indicated for the document. Table 31 below depicts an example of the document published to the search system 120, which may be subsequently indexed by the search system 120. The document that is published to the search system 120 may include the groupings of the one or more fields included in the document. For example, at the search system 120, various analyzer chain may be applied to each field in the document based on the schema of the search system 120 such that a tokenized representation of each field value may be present at the search system 120.

Table 31
```
{
  "SupplierAnId_lowercase_s": "AN01015051360",
  "Description.clean_text_en_s": "New Wireless Unimouse Right-Hand Mouse, Color: Black",
  "ShortName.clean_stopstem_en_s": "UNIMOUSE-W: Contour Right-Hand Wireless Unimouse",
  "StarRatings_tdouble_s": 0,
  "id_id_s": "342033aeb90826fb",
  "SupplierPartId_partial_s": "UNIMOUSE-WL",
  "Currency_lowercase_s": "USD",
  "MarketPrice_tdouble_s": 109.95,
  "Description.clean_stopstem_en_s": "New Wireless Unimouse Right-Hand Mouse, Color: Black",
  "SupplierPartId_lowercase_s": "UNIMOUSE-WL",
  "QuantitySold_tlong_s": 0,
  "Language_lowercase_s": "en",
  "ManufacturerPartNumber_string_s": "UNIMOUSE-2",
  "Color_string_s": "black",
  "Size_string_s": "36 in (diameter)",
  "ManufacturerName_text_en_s": "Contour Design",
  "SupplierPartId_text_en_s": "UNIMOUSE-WL",
  "Description.clean_stop_en_s": "New Wireless Unimouse Right-Hand Mouse, Color: Black",
  "ManufacturerPartNumber_lowercase_s": "UNIMOUSE-2",
  "IsHazardousMaterials_boolean_s": false,
  "IsReturnable_boolean_s": true,
  "ShortName.clean_text_en_s": "UNIMOUSE-W: Contour Right-Hand Wireless Unimouse",
  "ManufacturerName_lowercase_s": "Contour Design",
```

"ManufacturerPartNumber_text_en_s": "UNIMOUSE-2",
"TenantId_lowercase_s": "admin_hck",
"IsGreen_boolean_s": false,
"ShortName.clean_stop_en_s": "UNIMOUSE-W: Contour Right-Hand Wireless Unimouse",
"ManufacturerPartNumber_partial_s": "UNIMOUSE-2",
"UnitPrice_tdouble_s": 97.95,
"Uom_lowercase_s": "EA",
"QuantityAvailable_tlong_s": 10,
"SupplierPartId_string_s": "UNIMOUSE-WL",
"ItemId_lowercase_s": "searchadmin-1-1",
"NumberOfReviews_tint_s": 0,
"CommodityCodeHierarchy_lowercase_m": [
    "43",
    "4321",
    "432117",
    "43211708"
],
"ManufacturerName_string_s": "Contour Design",
"LeadTime.duration_tint_s": 10,
"LeadTime.interval_lowercase_s": "day",
"_version_":1677740244166770700
}

Figure 4D:
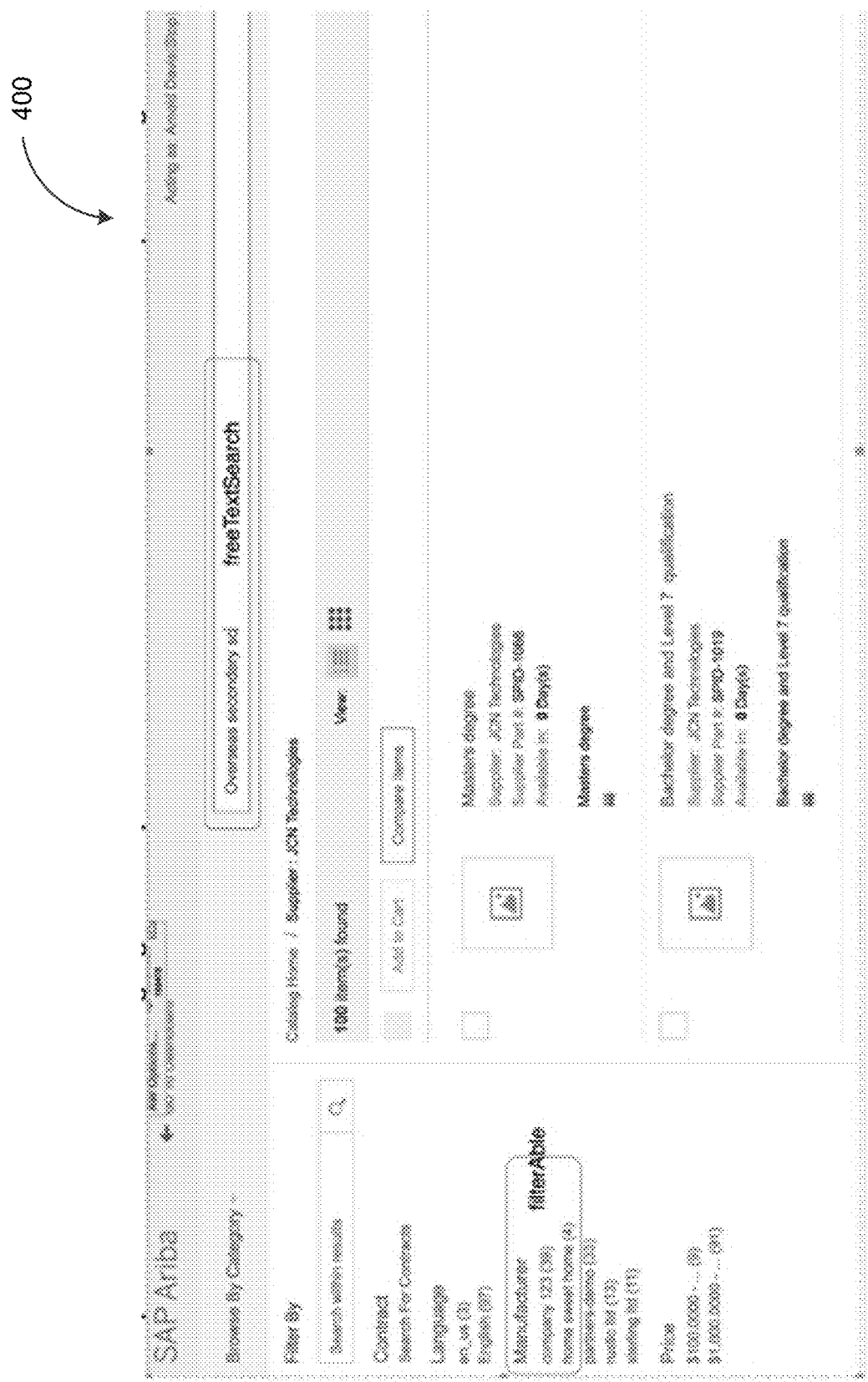
FIG. 4D depicts an example of a user interface for querying a search system, in accordance with some example embodiments.

In some example embodiments, documents indexed at the search system 120 may be queried defined on the corresponding types defined at the types controller 110. FIG. 4D depicts an example of a user interface 400 for querying the search system 120, in accordance with some example embodiments. The user interface 400 may be presented at the client 140 and a search query may be generated, for example, by the client application 145, based at least on a user's interaction with the user interface 400. Table 32 below depicts an example of a search query.

Table 32
{
    "queryid": "1577103339024",
    "session": "XYZ_UI9.1496197597",
    "userid": "qa_buyer_81",
    "app": "catalogservice",
    "querytype": "freetext", // Main intent of the search
    "tenant": "qa_buyer_81",
    "lang": "en",
    "q": [{
        "value": "Overseas secondary sc",
        "action": "freeTextSearch" II Kind of action that has to be performed on query(q) value
    }],
    "filters": [[{
        "field": "ManufacturerName",
        "value": "home sweet home",
        "action": "filterAble" // Kind of action that has to be performed on field (Manufacturer) with value ("home sweet home") on the result selected by the original query(q).
    }]
    "rows": 20,
    "start": 0
}

The search query may include one or more attributes including, for example, a type of query, the query text itself, and one or more filters. The type of query may indicate an intent of the corresponding query, which may be an array because the client application 145 may determine to either send the query to the search microservice 132 in its entirety or partition the query into one or more constituent parts and form multiple queries for the search microservice 132. The query may also be associated with one or more filters for applying to the result of the query. As shown in FIG. 4D, the user interface 400 may include one or more filters for selection by the user.

In some example embodiments, the search microservice 132 may parse the search query and identify the one or more actions associated with the query (e.g., free text search in the example shown in FIG. 4D). The search microservice 132 may interact with the types controller 110 to identify a selection of available capabilities, which may be specific to the client application 145 and/or the tenant associated with the user of the client 140. The user may or may not request an action to be performed on one or more specific fields. Accordingly, the search microservice 132 may construct a query for the search system 120 to include the action for all of the fields or one or more of the fields specified by the user. The search microservice 132 may pass, to the types controller 110, information identifying one or more of the client application 145, a tenant identifier, the action, and/or specified fields in order for the types controller 110 to fetch the application fields defined in the type and generate the corresponding field names and methods for the search system 120. The output of the types controller 110 may be cached in order to improve the performance for subsequent queries having a same set of parameters.

For example, in the example shown in FIG. 4D, the user specified, via the user interface 400, the action free text search, which is mapped to the freeTextSearch capability defined at the types controller 110. Accordingly, when the search microservice 132 requests for the fields having the free text search capability for the client application 145 and the corresponding tenant, the types controller 110 may identify first identify the types defined for the tenant and the client application 145 before identifying the fields having the freeTextSearch capability, constructing the corresponding field names at the search system 120, and returning the field names to the search microservice 132 for constructing and executing a corresponding query at the search system 120.

Alternatively, if the user may specify, via the user interface 400, the action filterable on the field ManufactureName. The action filterable may be mapped to the filterAble capability at the types controller 110. Accordingly, the types controller 110 may return the corresponding field name ManufacturerName_string_s at the search system 120, wherein string is the corresponding method at the search system 120 that may be applied to the contents of the field ManufacturerName. It should be appreciated that the method string may be identified by the group definition holding the mapping between methods at the search system 120 and capabilities at the types controller 110.

Figure 5:
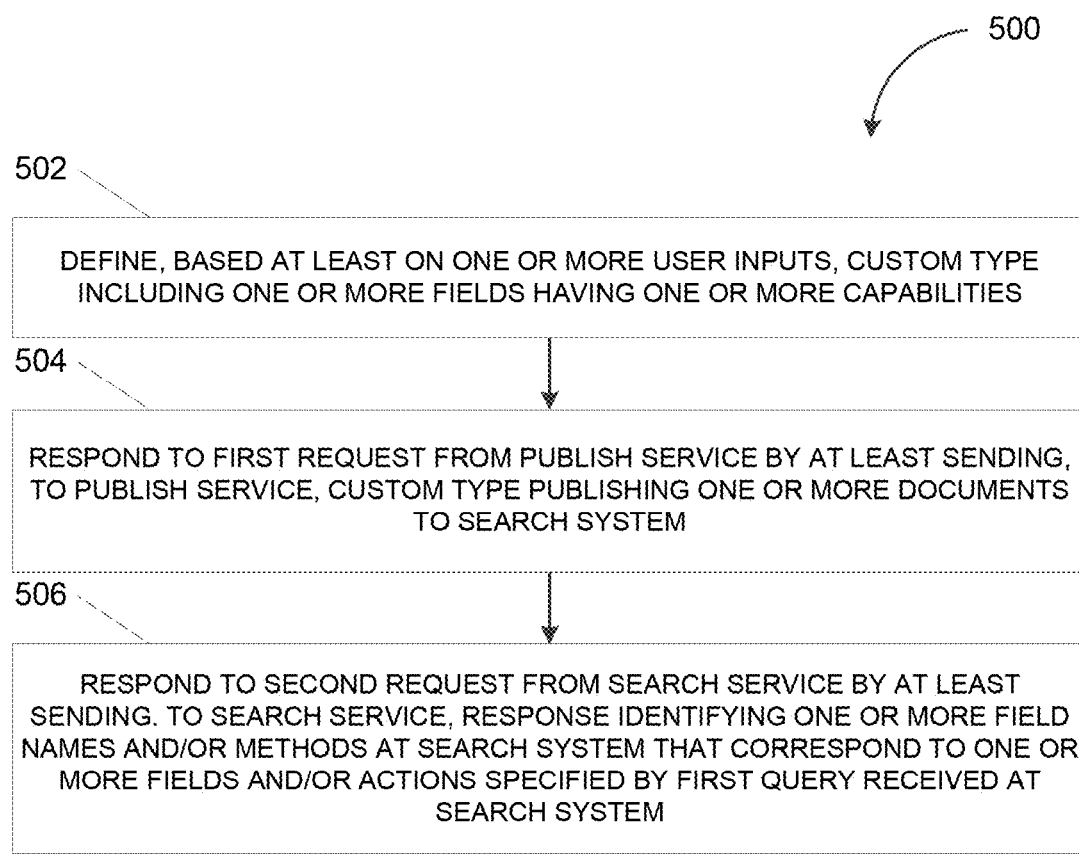
FIG. 5 depicts a flowchart illustrating an example of a process for a custom type, in accordance with some example embodiments.

FIG. 5 depicts a flowchart illustrating an example of a process 500 for a custom type, in accordance with some example embodiments. In some example embodiments, the process 500 may be performed by the types controller 110 in order to define, maintain, and operate on one or more custom types that include one or more fields, each of which adhering to a user selectable canonical type (e.g., primitive type, complex type, and/or the like) as well as one or more user selectable capabilities.

At 502, the types controller 110 may define, based at least on one or more user inputs, a custom type including one or more fields having one or more capabilities. In some example embodiments, the types controller 110 may be configured to support the definition of one or more custom types, specific to a single tenant or common across multiple tenants. The types controller 110 may further support a type hierarchy in which a custom type may be defined to inherit from one or more existing types. To define a custom type, the client application 145 may make an application programing interface (API) call (e.g., a Create API call) to the types controller 110 with a corresponding payload. For example, the custom type may be defined to include one or more fields, each of which adhering to a user selectable canonical type (e.g., primitive type, complex type, and/or the like) as well as one or more user selectable capabilities. Moreover, one or more of the fields in the type may be defined for enrichments such as search-specific enrichments configured to improve the relevance of the search results. The canonical type and the capabilities of the fields included in a type may determine the behavior of the search system 120 operating on the corresponding documents.

At 504, the types controller 110 may respond to a first request from a publish service by at least sending, to the publish service, the custom type for publishing one or more documents to a search system. For example, the client 140 may push, to the stream processing system 136, a document containing a payload attribute along with other meta data properties. The payload attribute may contain, in a data interchange format such as JavaScript Open Notation (JSON) format, an object that is defined, at the types controller 110, as custom type. Accordingly, upon receiving a payload including the document having the custom type for publication, the publish microservice 134 may query the types controller 110 for a corresponding schema for publishing the document to the search system 120. This schema may determine the behavior of the search system 120 including, for example, the indexing of the document having the custom type.

At 506, the types controller 110 may respond to a second request from a query service by at least sending, to the search service, a response identifying one or more field names and/or methods at the search system that corresponds to one or more fields and/or actions specified by a first query received at the search service. In some example embodiments, queries to the search system 120 may be resolved based at least on the custom types according to which documents are stored at the search system 120. For example, upon receiving a query generated by the client application 145 based on one or more actions of a user at the client 140 interacting with the user interface 400, the search microservice 132 may parse the search query and identify the one or more actions associated with the query (e.g., free text search in the example shown in FIG. 4D). The search microservice 132 may pass, to the types controller 110, information identifying one or more of the client application 145, a tenant identifier, the action, and/or specified fields in order for the types controller 110 to fetch the application fields defined in the custom type and generate the corresponding field names and methods for the search system 120. Moreover, the search microservice 132 may construct a query for the search system 120 based at last on the field names and methods of the search system 120.

Figure 6:
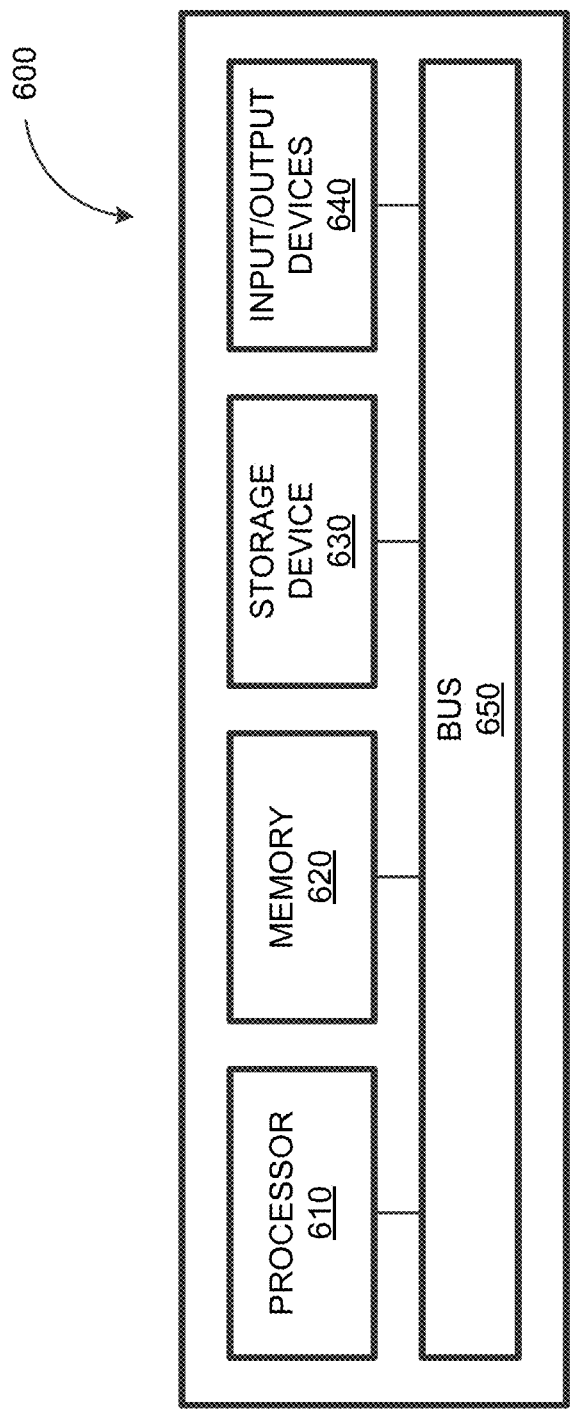
FIG. 6 depicts a block diagram illustrating a computing system, in accordance with some example embodiments.

FIG. 6 depicts a block diagram illustrating a computing system 600 consistent with implementations of the current subject matter. Referring to FIGS. 1A-B and 6, the computing system 600 can be used to implement the types controller 110, the search system 120, the search microservice 132, the publish microservice 134, the stream processing system 136, the client 140, and/or any components therein.

As shown in FIG. 6, the computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more components of, for example, the types controller 110, the search system 120, the search microservice 132, the publish microservice 134, the stream processing system 136, the client 140, and/or the like. In some example embodiments, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a floppy disk device, a hard disk device, an optical disk device, a tape device, a solid state drive, and/or other suitable persistent storage means. The input/output device 640 provides input/output operations for the computing system 600. In some example embodiments, the input/output device 640 includes a keyboard and/or pointing device. In various implementations, the input/output device 640 includes a display unit for displaying graphical user interfaces.

According to some example embodiments, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some example embodiments, the computing system 600 can be used to execute various interactive computer software applications that can be used for organization, analysis and/or storage of data in various formats. Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing items and/or functionalities. Upon activation within the applications, the functionalities can be used to generate the user interface provided via the input/output device 640. The user interface can be generated and presented to a user by the computing system 600 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program item, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   defining, based at least on one or more user inputs, a custom type including at least a first field having a first capability;
   in response to a first request from a publish service, sending, to the publish service, the custom type such that the publish service publishes, to a search system, one or more documents in accordance with a schema specified by the custom type; and
   in response to a second request from a search service, sending, to the search service, a response identifying one or more field names and/or methods at the search system that correspond to one or more fields and/or actions specified by a first query received at the search service, the one or more field names and/or methods identified based at least on the custom type.

2. The system of claim 1, wherein the first capability comprises index, free text search, keyword search, type ahead suggestion, hierarchical values, geospatial search, range, key, sort, facet, or filter.

3. The system of claim 1, wherein the first field is further defined to have a canonical type comprising Boolean, currency, date, double, float, integer, long value, part number, string, email, domain value, duration, image, point, entext, price, universal resource locator, or address.

4. The system of claim 3, further comprising:
   generating a validation error in response to determining that the canonical type of the first field is incompatible with the first capability.

5. The system of claim 1, further comprising:
   receiving a request to update the custom type by deleting the first field and/or adding a second field;
   in response to determining that the update necessitates a re-indexing of the one or more documents at the search system, maintaining the update in an inactive state until the re-indexing is complete; and
   responding to the second request based on the custom type without the update while the update is in the inactive state.

6. The system of claim 1, further comprising:
enriching the first field by at least associating, with the first field, a second field having a second capability.

7. The system of claim 1, wherein the first field is mapped, based at least on the first capability of the first field, to one or more groups of fields having the first capability.

8. The system of claim 1, wherein the defining of the custom type includes associating the custom type with a type identifier, wherein the first request includes the type identifier, and wherein at least a portion of the custom type sent to the publish service is cached at the publish service.

9. The system of claim 1, wherein the second request identifies a software application and a tenant associated with the first query, and wherein the one or more field names and/or methods at the search system are identified by least identifying the custom type as being associated with the software application and/or the tenant.

10. The system of claim 9, wherein the response enables the search service to generate, for execution at the search system, a second query including the one or more field names and/or methods at the search system.

11. A computer-implemented method, comprising:
defining, based at least on one or more user inputs, a custom type including at least a first field having a first capability;
in response to a first request from a publish service, sending, to the publish service, the custom type such that the publish service publishes, to a search system, one or more documents in accordance with a schema specified by the custom type; and
in response to a second request from a search service, sending, to the search service, a response identifying one or more field names and/or methods at the search system that correspond to one or more fields and/or actions specified by a first query received at the search service, the one or more field names and/or methods identified based at least on the custom type.

12. The method of claim 11, wherein the first capability comprises index, free text search, keyword search, type ahead suggestion, hierarchical values, geospatial search, range, key, sort, facet, or filter.

13. The method of claim 11, wherein the first field is further defined to have a canonical type comprising Boolean, currency, date, double, float, integer, long value, part number, string, email, domain value, duration, image, point, entext, price, universal resource locator, or address.

14. The method of claim 13, further comprising:
generating a validation error in response to determining that the canonical type of the first field is incompatible with the first capability.

15. The method of claim 11, further comprising:
receiving a request to update the custom type by deleting the first field and/or adding a second field;
in response to determining that the update necessitates a re-indexing of the one or more documents at the search system, maintaining the update in an inactive state until the re-indexing is complete; and
responding to the second request based on the custom type without the update while the update is in the inactive state.

16. The method of claim 11, further comprising:
enriching the first field by at least associating, with the first field, a second field having a second capability.

17. The method of claim 11, wherein the first field is mapped, based at least on the first capability of the first field, to one or more groups of fields having the first capability.

18. The method of claim 11, wherein the defining of the custom type includes associating the custom type with a type identifier, wherein the first request includes the type identifier, and wherein at least a portion of the custom type sent to the publish service is cached at the publish service.

19. The method of claim 11, wherein the second request identifies a software application and a tenant associated with the first query, wherein the one or more field names and/or methods at the search system are identified by least identifying the custom type as being associated with the software application and/or the tenant, and wherein the response enables the search service to generate, for execution at the search system, a second query including the one or more field names and/or methods at the search system.

20. A non-transitory computer readable medium storing instructions, which when executed by at least one data processor, result in operations comprising:
defining, based at least on one or more user inputs, a custom type including at least a first field having a first capability;
in response to a first request from a publish service, sending, to the publish service, the custom type such that the publish service publishes, to a search system, one or more documents in accordance with a schema specified by the custom type; and
in response to a second request from a search service, sending, to the search service, a response identifying one or more field names and/or methods at the search system that correspond to one or more fields and/or actions specified by a first query received at the search service, the one or more field names and/or methods identified based at least on the custom type.

* * * * *